INVENTOR.
Erwin B. Bahnsen

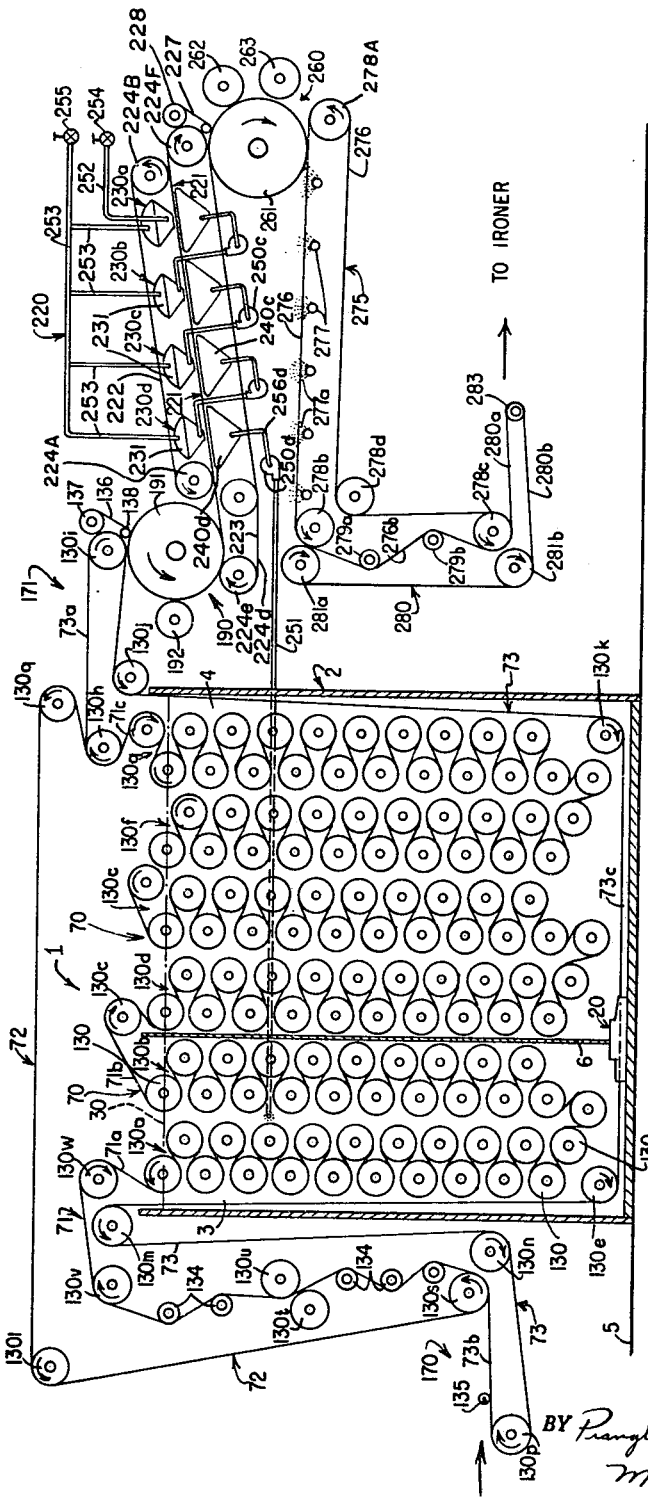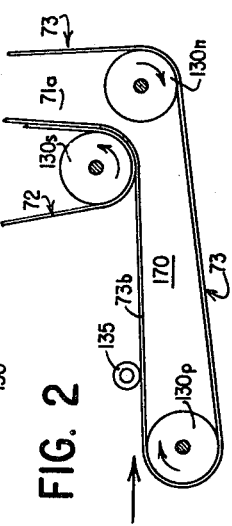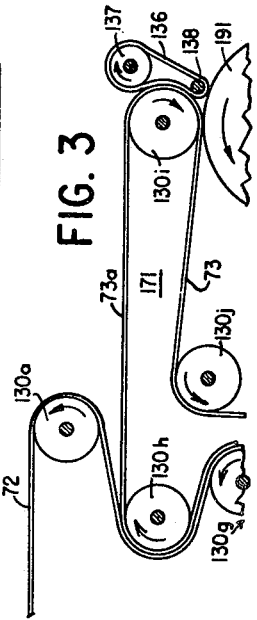

Feb. 3, 1970          E. B. BAHNSEN          3,493,322

CONTINUOUS RINSING AND DRYING METHOD AND APPARATUS

Original Filed Oct. 21, 1965          11 Sheets-Sheet 3

INVENTOR.
Erwin B. Bahnsen

BY Prangley, Baird,
Clayton, Miller & Vogel
Attys.

INVENTOR.
Erwin B. Bahnsen

Feb. 3, 1970     E. B. BAHNSEN     3,493,322
CONTINUOUS RINSING AND DRYING METHOD AND APPARATUS
Original Filed Oct. 21, 1965     11 Sheets-Sheet 7

INVENTOR.
Erwin B. Bahnsen

TO PUMP

INVENTOR.
Erwin B. Bahnsen
BY Pringley, Baird,
Clayton, Miller & Vogel
Attys.

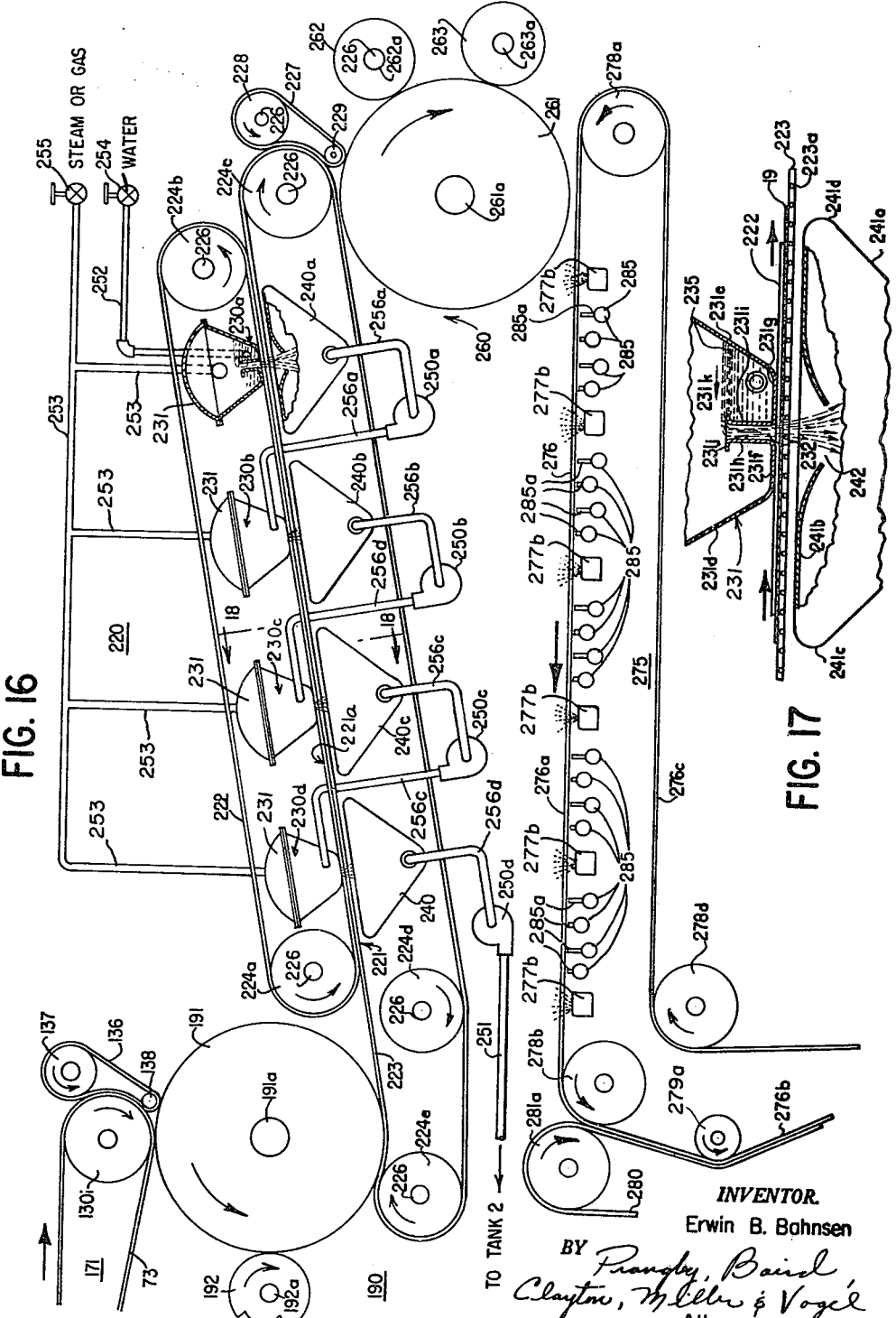

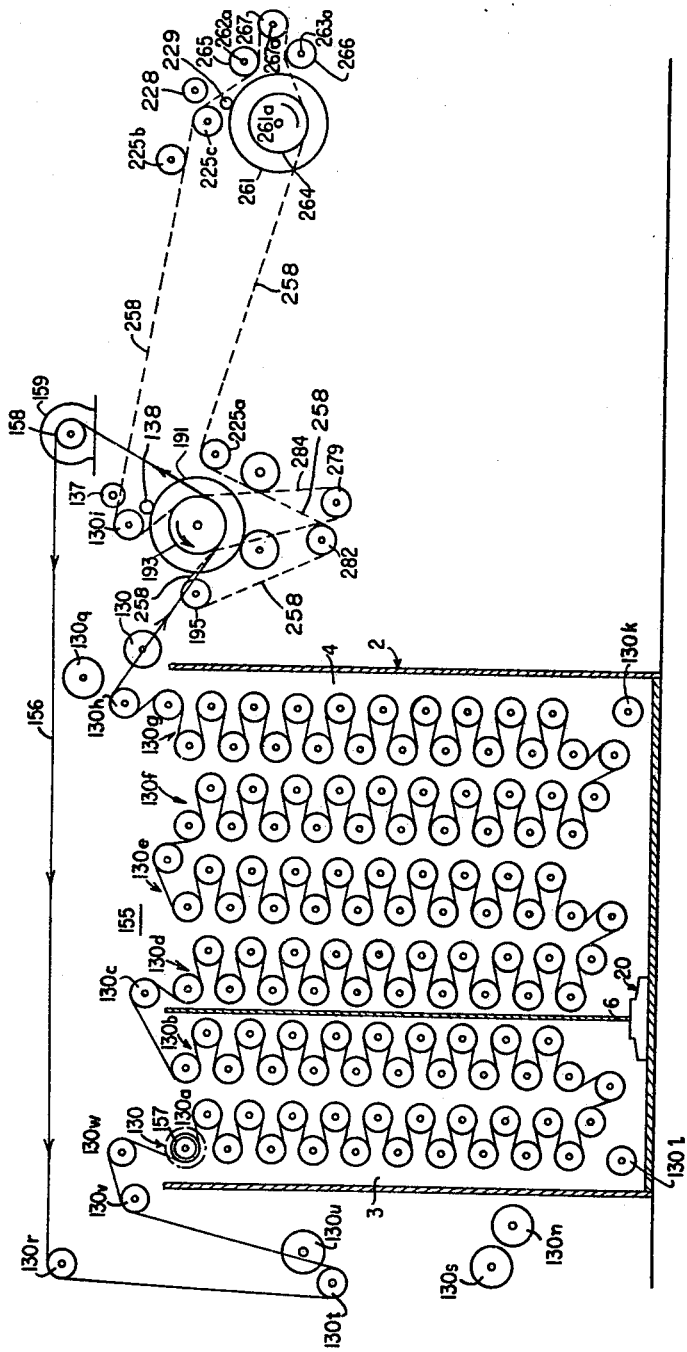

Feb. 3, 1970        E. B. BAHNSEN        3,493,322
CONTINUOUS RINSING AND DRYING METHOD AND APPARATUS
Original Filed Oct. 21, 1965        11 Sheets-Sheet 11
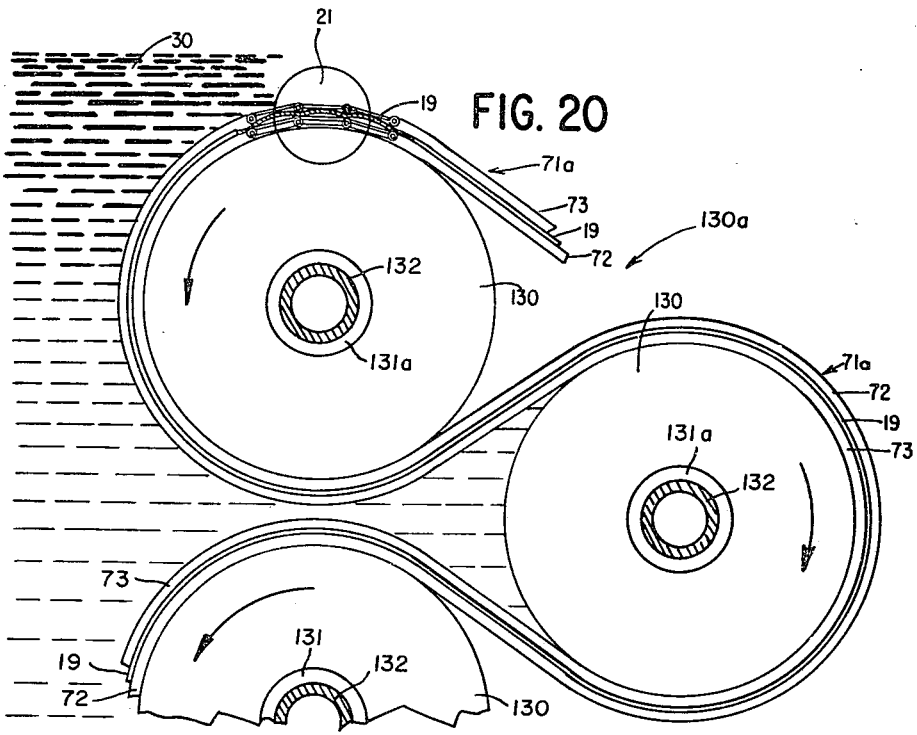
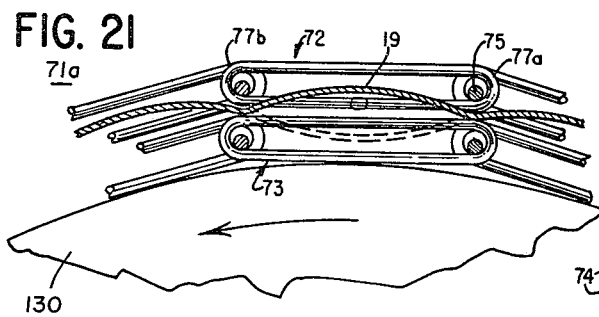
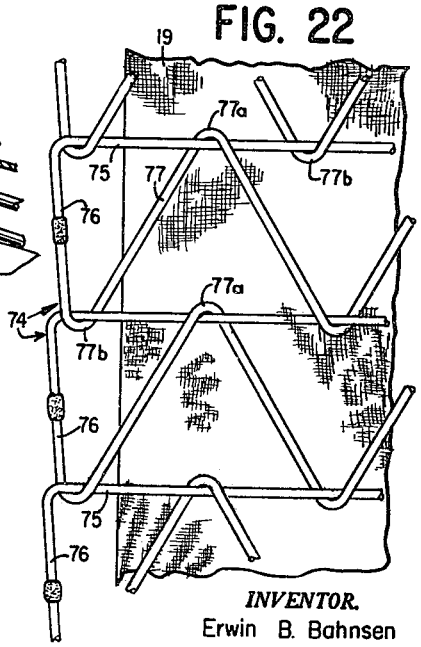
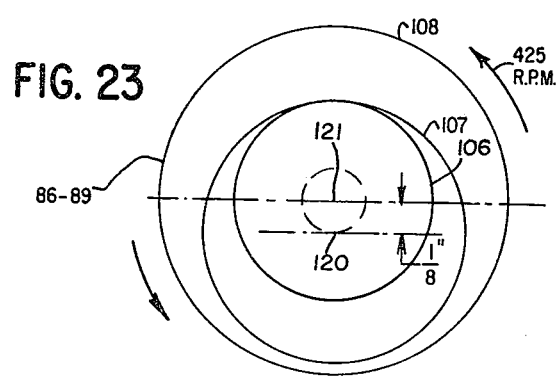
INVENTOR.
Erwin B. Bahnsen

United States Patent Office 3,493,322
Patented Feb. 3, 1970

3,493,322
CONTINUOUS RINSING AND DRYING METHOD AND APPARATUS
Erwin B. Bahnsen, Hinsdale, Ill., assignor to Steiner American Corporation, Salt Lake City, Utah, a corporation of Nevada
Original application Oct. 21, 1965, Ser. No. 499,137, now Patent No. 3,439,365, dated Apr. 22, 1969. Divided and this application July 19, 1968, Ser. No. 746,034
Int. Cl. D06f 37/00
U.S. Cl. 8—151         34 Claims

ABSTRACT OF THE DISCLOSURE

A method and an apparatus for washing, rinsing and drying soiled fabric articles, wherein the articles are washed by transporting them on a foraminous belt along a sinous path through a soil loosening alkaline solution and then through a soil removing detergent solution all while subjecting elemental portions of the fabric to cycloidal motion at a repetition rate of four hundred per minute and a maximum displacement of one-quarter inch, and wherein the articles are rinsed by forcing a mixture of water and gas repeatedly through the articles in a counter-current manner while the articles are transported along an upwardly inclined path, and wherein the articles are dried by subjecting them successively to radiant heat and blasts of warm air while the articles are transported along a horizontal path.

---

This application is a division of the co-pending application for United States Letters Patent Ser. No. 499,137, now Patent No. 3,439,365, filed Oct. 21, 1965 for Erwin B. Bahnsen for Continuous Washing Method and Apparatus.

This invention pertains to methods and apparatus for rinsing and drying pliant materials. The method and apparatus of this invention are useful in commercial laundries for washing flatwork, and are applicable especially for automatic, high speed, economical washing of rolled towels and other elongated, flexible fabric articles.

In general, the novel method of this invention is useful in a washing method that comprises the steps of disintegrating and loosening the soil by passing the work through an alkaline solution while imparting to each of the elemental portions of the work a cycloidal motion, removing the soil by passing the work through a detergent solution while maintaining the cycloidal motion, rinsing the detergent solution from the work such as by passing it beneath one or more orifices emitting hot gas intermixed with water, and then drying the work such as by passing it through a succession of gas flames.

In a preferred novel washing system embodying the method of this inventon, soiled flatwork is conveyed, between mutually-contiguous portions of two foraminous, endless belts disposed for movement through a tank having a first compartment filled with a predominantly alkaline solution and a second compartment filled with a predominantly detergent solution. In the first compartment soil is disintegrated and loosened and in the second compartment, the soil substantially is disassociated from the work. The portion of the conveyer transport mechanism immersed in the tank is subjected, in the preferred apparatus, to orbital motion of about one-eighth inch radius and about four hundred cycles per minute. As a result, each elemental portion of the flatwork moves cycloidally at a frequency of about 400 cycles per minute relative to the surrounding fluid. This process, it has been found, reduces the time required for effective cleansing action from about eighty minutes for conventional batch-type washing installations, to about three minutes for a continuous-duty system embodying the present invention.

Upon emergence from the tank, the flatwork in the preferred system, passes automatically through a roller-type wringer which expresses a large percentage of the detergent fluid from the work. After wringing, the flatwork is deposited upon the upper, substantially-horizontal surface of a first flat, endless open-mesh belt which carries it into sandwiched relation with the lower surface of a second flat, endless, open-mesh belt. While holding the flatwork between their contiguous surface portions, the conveyor passes beneath a succession of rinsing units which force a mixture of rinsing solution and gas through elongated orifices effectively in contact with or immediately adjacent the work and disposed transversely with respect to the direction of movement. Rinsing solution is supplied continuously to the last of the rinsing units. Beneath each orifice is a vessel for collecting the effluent, and a pump and conduit for transporting the effluent in a counterflow direction to the next unit where it is used again. Superheated steam or other suitable gas is supplied to each rinsing unit to heat the effluent, reduce the quantity thereof required for effective rinsing and to provide the pressure required to force the effluent-gas mixture through the work. The effluent from the unit nearest the tank is then conducted to the first compartment where it replenishes the fluid carried from the tank and expressed by the detergent wringer.

After discharge from the rinsing conveyer, excess liquid, in the preferred system, is expressed by a second roller-type wringer, and the work then is deposited on the upper surface of a wire-mesh, endless conveyor belt which carries it through a series of gas flames or across other suitable drying apparatus, for drying. Thus, soiled flatwork may move continuously and automatically through a complete washing system embodying the present invention, and emerge within minutes clean, dry, or damp-dry, in condition for immediate use, ironing, or other further processing as required.

The idealized general objectives of automatic, continuous-duty rinsing and drying systems include high speed, effective rinsing and drying action with minimum wear on the work being processed, and increased economy of operation through minimization or elimination of the need for manual participation. Needless to say, these objectives have not been attained by the prior art.

In the past, the use of upper and lower endless, open-mesh belts for transporting soiled items through a continuous rinsing and drying system has been recognized as an advantageous method which minimizes wear and enhances automatic processing by maintaining the work fixed in a tension-and-stretch free, flat condition during its trip through the rinsing and drying cycles.

The novel method and apparatus of this invention resolves the problems which have plagued the prior art, and, for the first time, achieves the idealized general objectives defined for automatic, continuous-duty rinsing and drying systems. In fact, the rinsing and drying efficiency of a system embodying this invention has been increased so greatly that the time required for processing heavily-soiled flatwork is on the order of four percent of that required by batch-type washing systems. Further economy is achieved by repeatedly using the same rinse solution in successive stages of rinsing. This is done by conducting the rinse solution along a counterflow path from the last to the first of a multiplicity of rinsing units, and thenceforth to the first washing tank where is replenishes the fluid removed from the tank by the work as it passes to the rinser stage.

An automatic, continuous-duty washing system embodying the present invention comprises, in its presently preferred form, a tank having a first compartment containing a predominantly alkaline solution for disintegrating and loosening (breaking) the soil, and a second compartment containing a predominantly detergent solution for disassociating the soil from the work; an orbital frame having roller-support brackets suspended in the first and second compartments; rotatable rollers mounted in mutually-parallel and spaced-apart relation in opposing support brackets; a pair of flat, endless, foraminous belts having a portion of their external surfaces disposed in laminar relation, the laminar portion being sinuously interwoven with said rollers; first means for imparting rotation to the rollers so that the belts move together in the same direction along an undulating path while traveling through the first and second compartments, whereby work to be washed can be flattened and inserted between the belts at the point where the belts converge, and thenceforth be held more or less fixedly in sandwiched relation with the belts as they pass through the tank; and second means for producing orbital motion of the frame and consequent cycloidal motion of each elemental portion of the work as it moves through the tank. In addition, the preferred system includes means for receiving and wringing detergent automatically from the work emerging from the tank; a rinsing conveyor formed of two flat, endless, openmesh belts having a portion of their external surfaces disposed substantially horizontally and in laminar relation, whereby the upper surface of the lower belt may receive work emerging from the detergent wringer and carry it into sandwiched relation with the upper belt for its trip through the rinser; a multiplicity of rinsing units, the preferred form, having narrow elongated orifices effectively in contact with or immediately adjacent the upper surface of the laminally-related belts; means for supplying superheated steam or another gas to each of the rinsing units; means for supplying a rinsing fluid to the last of the rinsing units; means disposed below each of said rinsing units for collecting the rinse effluent and conducting it counter to the direction of rinse conveyor movement to the next succeeding rinsing unit where it is used again; means for conducting the rinse effluent from the unit nearest the tank to the first compartment of the tank in order to replenish liquid lost at the detergent wringer; means for wringing rinse liquid from the work as it emerges from the rinse conveyor; a horizontal drying conveyor comprising a flat endless woven wire belt disposed substantially-horizontally in a position to receive work discharged from the rinsing conveyor; and a plurality of gas flame burners or other drying units disposed beneath or adjacent the drying conveyor between its receiving and discharge points for drying the work.

From the foregoing, it should be apparent that the objects of this invention include the provision of:

(1) An automatic, high-speed, economical, continuous-duty rinsing and drying method and system;

(2) An automatic, high-speed, continuous rinsing and drying method and system wherein economy is achieved through reuse of the same rinse solution flowing through a plurality of rinsing units in a direction counter to the movement of the work.

(3) An automatic, continuous-duty rinsing and drying system characterized by markedly greater speed, cleansing effectiveness, economy of operation, and gentleness of work processing than could be obtained through utilization of the methods and apparatus of the prior art.

The foregoing paragraphs are intended to summarize and explain the significance of this invention in relation to the problems which it resolves, and should not be construed to narrow the scope of protection delimited by the claims set forth hereinafter. For a more complete understanding of the procedures, structure, operation, and novel features of the method and apparatus of this invention, reference is made to the following description and the drawings, wherein:

FIG. 1 represents diagrammatically a longitudinal cross section through the feeder, washer, detergent wringer, rinser, water wringer, and dryer stages of a washing system in accordance with the method of this invention;

FIG. 2 is an enlarged diagrammatic representation of a longitudinal cross section through the feeder stage;

FIG. 3 is an enlarged representation of a longitudinal cross section of the portion of the system leading to the detergent wringer stage;

FIG. 16 is an enlarged diagram in partial cross section of the front side elevation of the soap wringer, rinsing, water wringer, and dryer stages of the washing system incorporating this invention;

FIG. 17 is an enlarged side view, in partial cross section, of one of the knife rinsing units utilized in the rinsing stage;

FIG. 19 represents diagrammatically the path of the chain drives for the respective conveyor transports of the washer, and dryer stages;

FIG. 20 illustrates, in greatly enlarged form, the laminal relation of conveyor belts and interjacent flatwork as they move along their sinuous path through the stationary washing solution in the washer stage;

FIG. 21 is an enlarged view of the section 21 of FIG. 20 representing the manner in which fabric is sandwiched between the conveyor belts during its trip through the washer, and how the fabric is flexed back and forth during the orbital motion of the conveying mechanism;

FIG. 22 is an enlarged plan view of a wire mesh belt suitable for use in the conveyor of the washer stage; and FIG. 23 represents preferred eccentricity details for mounting the rotatable supporting shaft for the orbital frame.

THE WASHING SYSTEM

Figure 4:
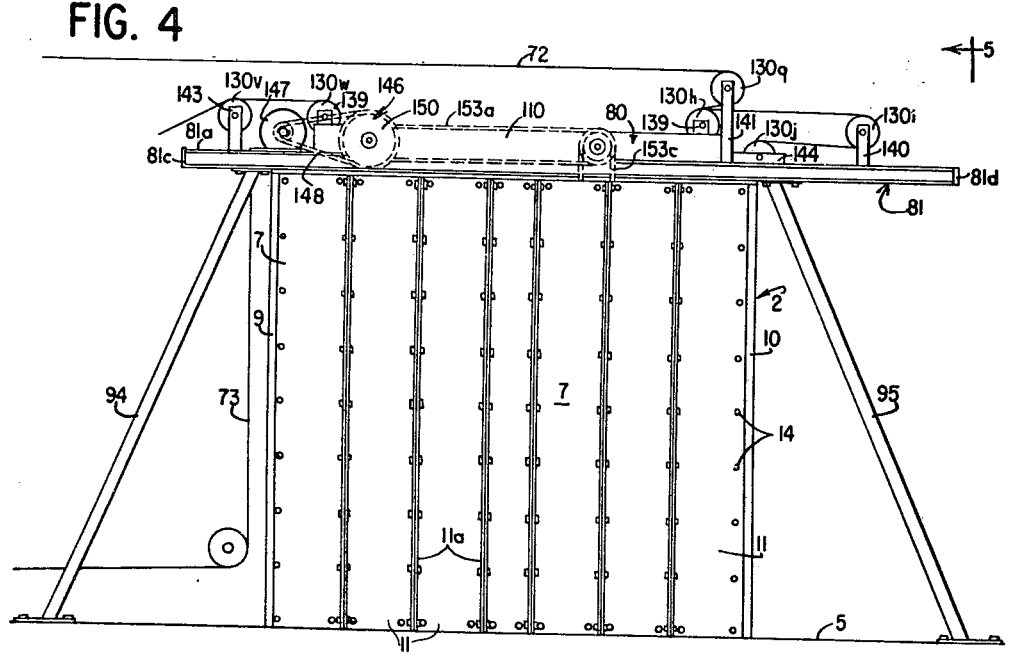
FIG. 4 is a front side elevation of the washer stage representing general features of tank construction and the orbital driving mechanism in a preferred embodiment of the system.

As represented in FIG. 1, a continuous-duty, automatic washing system incorporating therein a novel rising method and apparatus in accordance with this invention generally comprises a washer stage 1 wherein the work is sandwiched between endless belts of a conveyor 71 and carried through the washing solutions of tank 2 while being subjected simultaneously to an orbital motion provided by a conveyor transport mechanism 70, and a roller-type detergent wringer stage 190 disposed beneath the discharge end of the conveyor 71 for expressing washing solution from the work emerging from the tank 2. A rinser stage 220 provided with an endless belt conveyor 221 is disposed in cooperative relation with the wringer stage 190 for receiving and carrying the work from the wringer stage 190 successively beneath each of four rinsing units 230a, 230b, 230c, and 230d, wherein the same rinse solution supplied via a pipe 252, and moving in a counterflow direction, is mixed in each unit with superheated steam or air or other gas supplied through pipes 253 and is then forced under pressure through the work. A roller-type rinse wringer stage 260 is disposed at the discharge end of the rinse conveyor 221 for expressing rinse solution from the work leaving the rinser stage 220, and a dryer stage 275 having an endless belt conveyor 276 is disposed in cooperative relation with the rinse wringer stage 260 for receiving and carrying the work past suitable drying means which, for simplicity, is shown in FIG. 1 to be gas flames emanating from a plurality of burners 277.

In one embodiment of this invention it was found that the speed and effectiveness of disassociation was sufficient to enable heavily-soiled flatwork to be cleansed satisfactorily while traveling for only three minutes through the tank 2 along a conveyor path 240 feet in length. This extraordinary cleansing action appears to be attributable principally to an orbital motion imparted to the immersed portion of the conveyor transport mechanism 70 in a manner to be described below. As a result of the forward movement of the conveyor 71 and the orbital motion of the immersed portion of the transport mechanism 70, each elemental portion of the conveyor 71, and the work carried thereby moves along a cycloidal path while traveling through the tank 2. As a consequence of this motion, elemental portions of the work are in continuous appulsive-reactive interaction with the surrounding cleansing solutions. It is this continuous interaction between the work and the fluid washing solutions which effects the remarkably rapid and thorough disassociation of the dirt.

Substantially all of the cleansing solution and suspended dirt remaining in the flatwork is diluted and displaced as a result of the economical, rapid, and effective rising action occurring in the novel rinser stage 220. In the rinser stage 220, the rinse solution supplied to the rinsing unit 230d is collected and then pumped into the rinsing unit 230c where it is again heated and forced through the work by superheated steam, or air or other gas, supplied through the pipes 253 from a source (not shown). In this manner, the same rinse solution also is reused successively in the rinsing units 230b and 230a. From the latter unit, the rinse solution is collected and conducted to the tank 2 where it replenishes liquid lost at the detergent wringer stage 190. Because the same rinse solution is conducted in a counterflow direction and is heated and mixed with superheated steam or hot air or other gas prior to expulsion through the work beneath each of the four rinsing units 230a to 230d, a considerable reduction in the required amount of rinse solution per unit of time is effected. For example, only 50 gallons of rinse solution per minute would be required for excellent rinsing action across work having a transverse dimension of ten feet. This means that the consumption of rinse solution may be about 1.55 gallons to 1.75 gallons per pound of dry fabric, as compared to an average consumption of about 3.5 gallons per pound required by conventional rinse systems. Hence, the rinser stage 220 not only rinses rapidly and efficiently, but with less consumption of rinse solution than has been required heretofore by conventional washing systems.

WASHER STAGE

The washer stage 1, illustrated schematically in FIG. 1, is made up of the endless belt conveyor 71, the tank 2, and the conveyor transport mechanism 70 including a series of rollers 130 and 130a to 130w, roller drive mechanism described hereinafter in detail and illustrated in FIG. 19, an orbital support frame 80 which supports roller support brackets 90 to 93 mounting the rollers 130 in the tank 2, and an orbital drive mechanism 146 for imparting the aforedescribed orbital motion to the roller support brackets 90 to 93 and thus to those rollers 130 carried thereby. The conveyor 71 includes a feeder section 170 for receiving dry work manually or otherwise fed into the washing system, a laminar portion 71a for transporting the work along a sinuous path via groups of the rollers 130 immersed in a first compartment 3 and a second compartment 4 of the tank 2, and a discharge section 171 for carrying the work into the detergent wringer stage 190.

The conveyor 71 includes upper and lower open-mesh, flat, endless belts 72 and 73, respectively, made of stainless steel, molded nylon, or other non-corrosive materials characterized by high tensile strength and durability. One type of foraminous belting suitable for use in fabricating the upper and lower endless belts 72 and 73 is represented best in FIGS. 21 and 22. As shown in these figures, a suitable mesh belt is made of a plurality of sections 74, each section 74 having a straight end 75, inwardly inclined sides 76, and a series of zig-zag loops 77 having one set of colinear apexes 77a in linking relation with its own straight end 75 and another set of apexes 77b in linking and pivotal relation with the straight end of the next adjacent section 74. A mesh formed in this manner and having about eight apertures per lineal and transverse foot has been found to provide sufficient support and openings of adequate size for optimum appulsive-reactive interaction between the work and the cleansing solutions. A reduction in the size of the openings attenuates the interaction and yields less satisfactory washing results.

As represented in FIGS. 1 and 2, the upper and lower belts 72 and 73 converge to form the laminar portion 71a of the conveyor 71 which is carried on the rollers 130 through a cleansing solution 30 contained in the tank 2. A chain and sprocket driving mechanism, to be described below, drives the upper belt 72 in a general counter-clockwise direction, and the lower belt 73 in a general clockwise direction. Hence, the sections of the belts 72 and 73 forming the laminar portion 71a of the conveyor 71 move together and in the same direction through the tank 2. Concurrently with linear movement of the belts 72 and 73, the orbital drive mechanism 146 (hereinafter described), imparts orbital motion to the rollers 130 within the tank 2. Consequently, as will be seen, each element of the laminar portion 71a of the conveyor 71 moves along a cycloidal path through the solution 30. It is this motion which produces the appulsive-reactive interaction between the flatwork designated by the numeral 19 and the cleansing solution 30 required to achieve the extraordinary speed and washing results made possible by the method and apparatus of this invention.

The movement of the laminar portion 71a of the conveyor 71 through the tank 2 is along a sinuous path down and around the outer peripheries of the rollers 130 in a first vertical tier or festoon 130a of the rollers 130, up and around the rollers of a second tier 130b, both of the tiers 130a and 130b being in the first compartment 3 of the tank 2, thence over a drive roller 130c and down a tier 130d, up a tier 130a, down a tier 130f, up a final tier 130g, and thence out of the tank 2 over a drive roller 130h. FIG. 20 illustrates schematically, on an enlarged scale, how the two belts 72 and 73 move in the sinuous path down a representative tier of the rollers 130 with the flatwork 19 disposed between the belts 72 and 73. To minimize stress in the laminar portion 71a, all of the rollers of the tiers 130a, 130b, 130d, 130e, 130f and 130g are driven synchronously by a chain and sprocket roller drive mechanism 155 to be hereinafter described. From the drive roller 130h, the lower belt 73 diverges from upper belt 72 and enters the discharge section 171 of the conveyor 71. In the discharge section 171, the lower belt 73 moves along a short horizontal flight 73a and then around a feeder roller 130i of the detergent wringer stage 190. From this point the lower belt 73 is carried via idler rollers 130j, 130k, 130l and 130m along a return flight running adjacent to the inner surfaces of the ends and bottom of the tank 2, and then via an idler roller 130n back to the feeder section 170 of the system beginning at a roller 130p.

Upon leaving the drive roller 130h, the upper belt 72 diverges from the lower belt 73. This frees the flatwork emerging from the tank 2, leaving it lying in position on the surface of the horizontal flight 73a for passage through the discharge section 171 and entry into the detergent wringer stage 190. After diverging from the lower belt 73, the upper belt 72 begins its return flight to the feeder section 170 via an idler roller 130q and a drive roller 130r.

The staggered arrangement of the rollers 130 in the tank 2 advantageously lengthens the path of travel of the conveyor 71 through the cleansing solutions while maintaining the belts 72 and 73 pressed together tightly enough to hold the interjacent work 19 firmly in position, a requirement for translation of the orbital motion of the rollers 130 into efficient appulsive-reactive interaction between the work and the cleansing solutions. Furthermore, the relationship of the lengths of drive chain corresponding, respectively, to the length of the flight between two drive rollers 130v and 130w, and the length of the flight between the drive roller 130h and the idler roller 130q, are adjusted to insure that enough slack exists in these short flights of the conveyor 71 to enable orbital motion of the rollers 130h and 130w along with their adjacent tiers of rollers 130, without producing harmful stresses in the belts 72 and 73.

The feeder section 170 of the system (FIG. 2), includes a short horizontal flight 73b of the lower belt 73 supported at a convenient working level above a floor 5 and extending between the roller 130p and the point of convergence of the lower belt 73 with the return flight of the upper belt 72 at a roller 130c. The flatwork 19 is, of course, fed into the system by feeding the flatwork onto the horizontal flight 73b, where it is carried to the idler roller 130s where the two belts 72 and 73 converge and, thus, thereafter hold the flatwork therebetween. From the roller 130s, the conveyor 71 follows a vertical flight leading into the tank 2. A drive roller 130t and a guide roller 130u are located in positions which will relieve the belts 72 and 73 from much of the strain of supporting their own weight during the upward flight, and a series of guide rollers 134, supported in spaced-apart and staggered relation, bear against opposite external surfaces of the belts 72 and 73, thereby pressing them firmly together to preserve their laminar relation and preventing the flatwork sandwiched between them from tending to slip out of position. The drive rollers 130v and 130w support the conveyor 71 in a short aerial flight over the forward edge of the tank 2 and into its downward path along the first vertical tier of rollers 130a.

An auxiliary roller 135 (see FIG. 2) may bear against the upper surface of the short horizontal flight 73b at the feed section 170 of the system to preserve the prearranged and flattened position of the flatwork 19 during its brief trip along the horizontal flight 73b to the roller 130s, where the upper belt 72 converges upon both the work and the lower belt 73. To facilitate manual positioning and smoothing of the work in preparation for feeding it into the conveyor 71, an apron (not shown) may be disposed adjacent to the roller 130p of the feeder section 170.

The discharge section 171 of the conveyor 71 (see FIG. 3) includes the short horizontal flight 73a of the lower belt 73, the feeder roller 130i, and a guide belt 136 supported, in contiguous relation with the portion of the lower belt 73 around the feeder roller 130i, by rollers 137 and 138. Hence, the flatwork 19 transported on the short horizontal flight 73b comes into interjacent relation with the guide belt 136 and the belt 73 and remains there while being carried around the feeder roller 130i to the surface of a rotatable drum 191 of the detergent wringer stage 190.

The rectangular tank 2 is divided into the first compartment 3 and the second compartment 4 by a transverse partition 6. The first compartment 3 preferably contains an alkaline solution for disintegrating and loosening dirt on and in the flatwork 19, and the second compartment 4 preferably contains a detergent-bleach solution for effecting disassociation of the dirt from the work 19. Although the dry work 19 entering the compartment 3 becomes saturated and carries some of the alkaline solution into the compartment 4, substantially an equal amount of liquid is carried out of the compartment 4 as the work emerges from the tank 2 and enters the detergent wringer stage 190. Hence, the transmission of fluid from the compartment 3 into the compartment 4 does not cause the latter to overflow. Furthermore, the orbinal motion imparted to the rollers 130 shakes excess fluid from the conveyor 71 and from the work 19 carried thereby while it is traversing an aerial flight 71b in moving from the compartment 3 to the compartment 4, and while traversing an aerial flight 71c in moving from the compartment 4 to the detergent wringer stage 190. Moreover, the relatively small amount of alkaline solution added to the compartment 4 has virtually no effect on the cleansing efficacy of the detergent-bleach solution contained therein.

The fluid removed from the compartment 3 by absorption in and adsorption on and entrainment with the work 19 is replenished by the rinse effluent from the rinser stage 220 through a pipe 251. Inasmuch as the volume of the rinse effluent exceeds the amount of alkaline solution absorbed in and adsorbed on and entrained with the work 19 leaving the compartment 3, this latter compartment is provided with an overflow pipe (not shown). Furthermore, the tank 2 may be equipped with conventional devices (not shown) for adding alkali, detergent and bleach, as desired, while the washing system is in operation. Alternatively, these supplies may be added manually.

Figure 7:
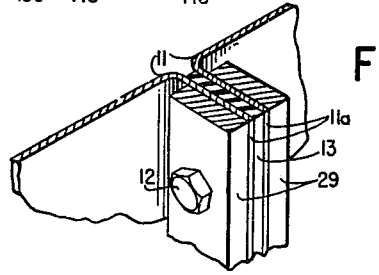
FIG. 7 is an enlarged section representing the structural details of the seams which may be used to unite panels forming the side and end walls of the washer tank.

The structural feature of the tank 2, in the preferred embodiment, are represented best in FIGS. 4, 5, 9 and 10. There are provided a front side wall 7, a rear side wall 8, a front end wall 9 and a rear end wall 10 which are all fabricated of rectangular panels 11 made of stainless steel or other corrosion-proof material having the requisite strength and imporosity, and having flanges 11a (FIG. 7) extending in the same direction from the edges of their long sides. Bolts 12 may be used to fasten the flanges 11a of the adjacent panels 11 together between rectangular reinforcing strips 29, and in abutting and watertight relation against a gasket 13 (FIG. 7).

Figure 6:
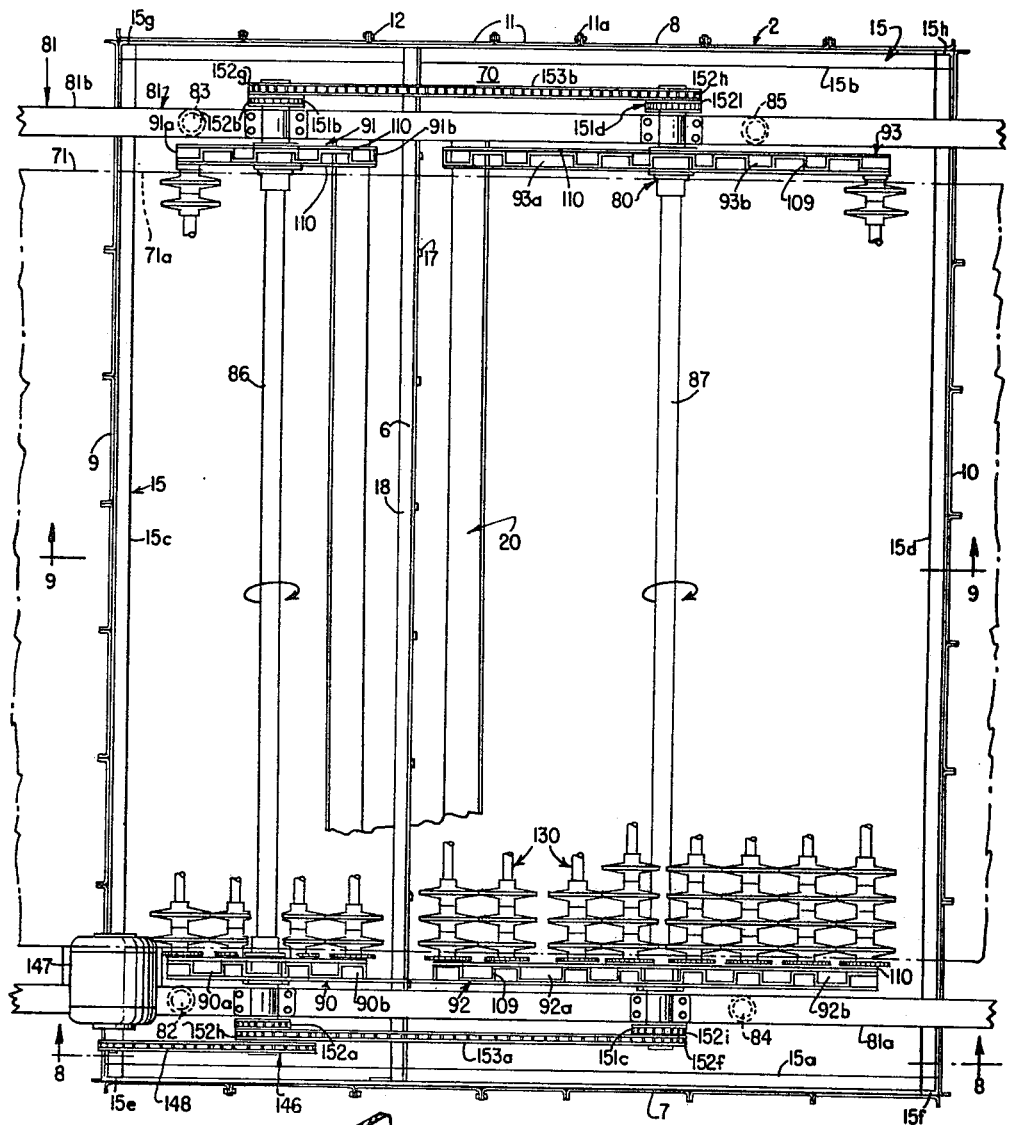
FIG. 6 is a top view of the washer stage representing general features of the tank, orbital frame and driving mechanism and conveyor rollers, with the general location of the conveying belts indicated by broken lines and certain upper rollers removed for clearness of illustration.
Figure 8:
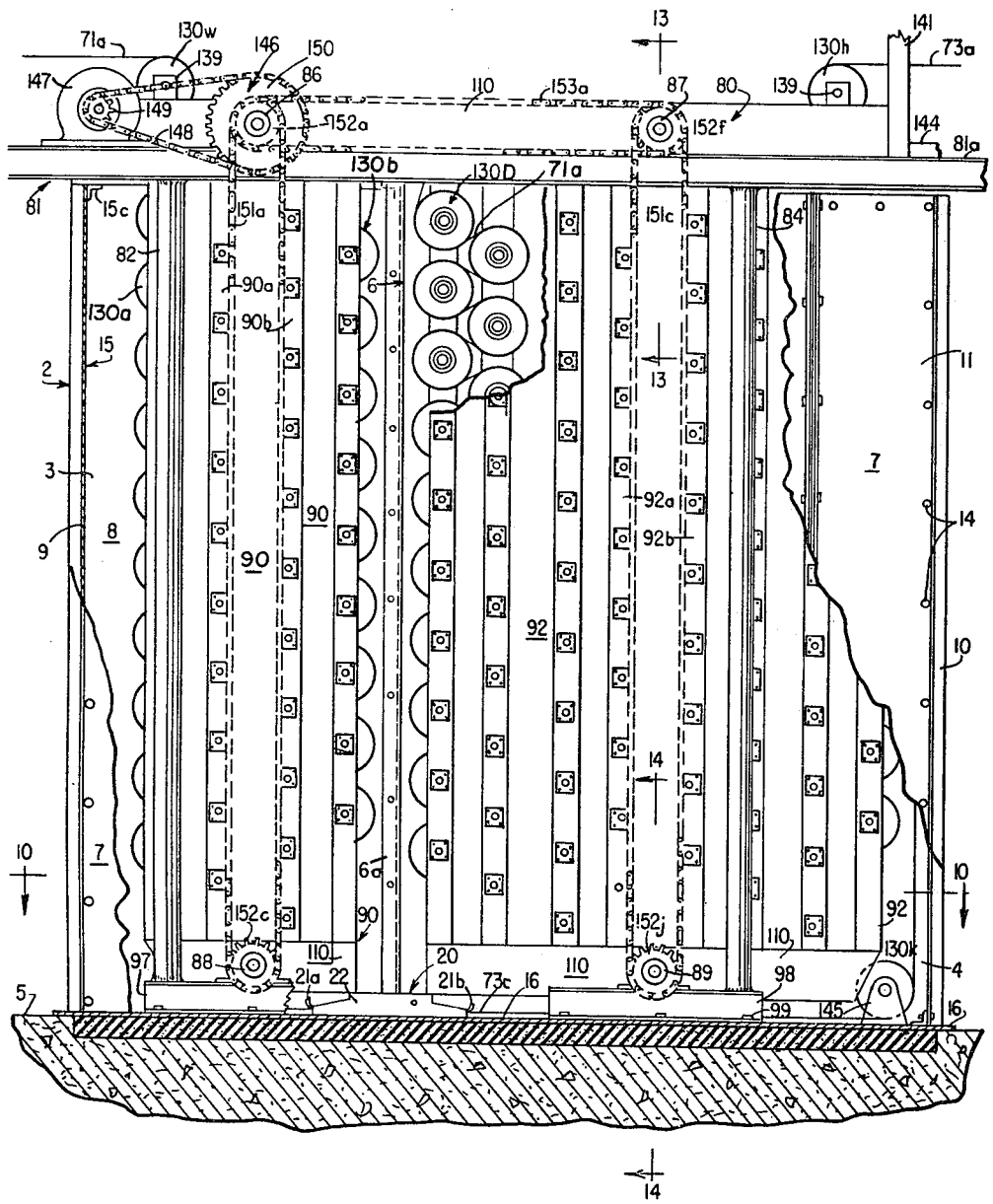
FIG. 8 is a longitudinal cross section in elevation of the washer stage taken substantially along the plane 8—8 of FIG. 6, and representing features of the orbital frame and its drive mechanism, with certain portions of the tank wall shown and other portions broken away.
Figure 9:
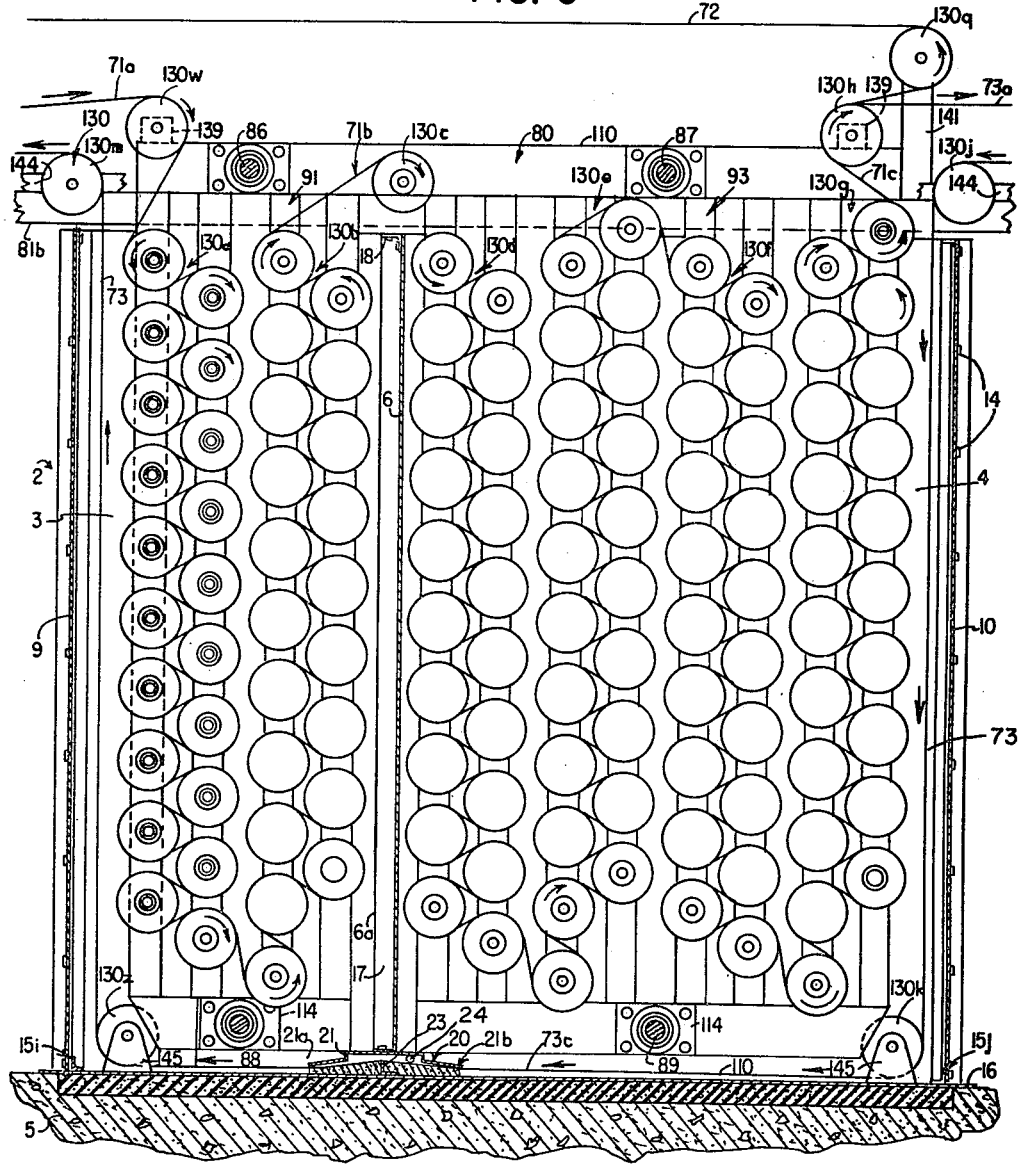
FIG. 9 is a longitudinal cross section in elevation of the washer stage taken substantially along the plane 9—9 of FIG. 6, and representing, in part schematically, structural features of the tank, the staggered arrangement of the conveyor-transport rollers mounted thereon, and the sinuous path of the conveyor belts through the washer stage.
Figure 10:
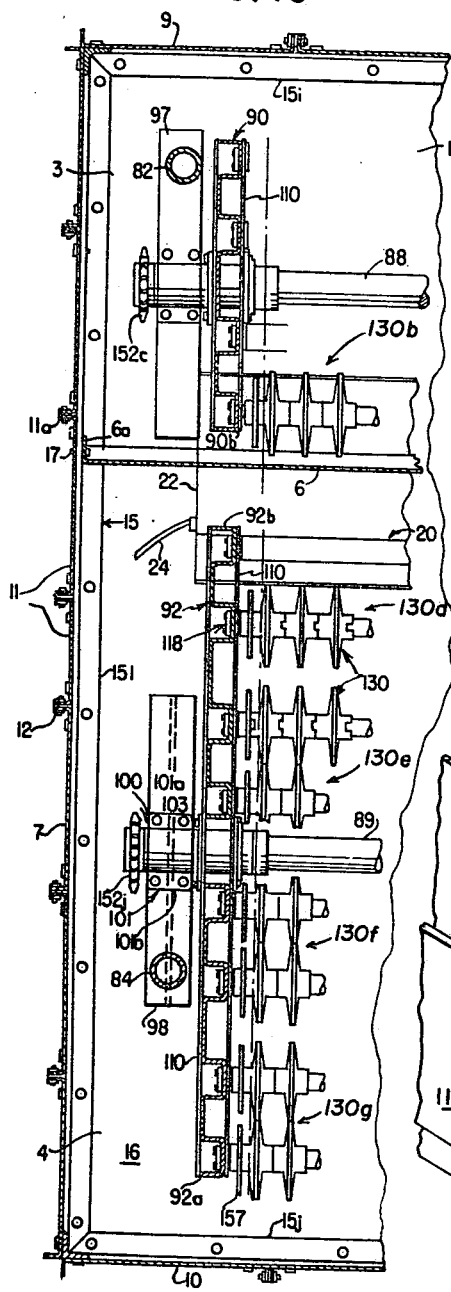
FIG. 10 is an enlarged partial horizontal cross section taken along the plane 10—10 of FIG. 8, and representing structural features of the tank, the orbital frame and drive mechanism, and the conveyor-transport rollers.

The panels 11 are fastened by bolts 14 to a rectangular frame 15 made, for example, of stainless steel angle bars supported on a stainless steel bottom plate 16 of the tank 2. The rectangular top of the frame 15 (FIG. 6) comprises four horizontal angle bars 15a, 15b, 15c and 15d fastened end-to-end to the respective upper extremities of four upright angle bars 15e, 15f, 15g and 15h. The bottom of the frame 15 may be formed in a manner similar and may include end bars 15i and 15j (FIG. 9). A front side bar 15k (FIG. 10), and rear side bar (not shown). The bottom angle bars may be welded to the bottom plate 16 (FIGS. 8 and 9) to form a leakproof seal. Holes are provided in the angle bars 15a through 15h and along the short sides of the panels 11 to accommodate the bolts 14 used for fastening the panels 11 to the frame 15. Watertight seals between the frame 15 and the walls may be effected through the use of gaskets (not shown) in a manner similar to that used in fastening the flanges 11a of the panels 11 to each other (FIG. 7). By use of the construction just referred to, it will be appreciated that the individual panels 11 may easily be removed for ready access to the interior of all parts of the tank.

The partition 6, made of a suitable non-corrosive material like stainless steel, for example, extends transversely from the front side wall 7 of the tank to the rear side wall 8 thereof, thereby dividing the interior of the tank 2 into the previously mentioned first compartment 3 and the second compartment 4. Flanges 6a, provided along the sides of the partition 6 (FIG. 10), have holes for accommodating bolts 17 which secure the partition to the front and rear side walls 7 and 8 of the tank 2. The upper edge of the partition 6 is secured by more bolts 17 to an angle bar 18 (FIG. 6) extending transversely between the angle bars 15a and 15b forming the upper horizontal sides of the frame 15. The bottom edge of the partition 6 is notched and flanged. The notched portion of the bottom edge of the partition 6 is fastened to the top of an air chamber 20 (FIGS. 8 and 9), and the remainder is fastened to the bottom plate 16 of the tank 2.

The air chamber 20 is disposed between the partition 6 and the bottom plate 16 of the tank 2 in order to provide a passage through the partition 6 for a return flight 73c of the lower belt 73. The air chamber 20 has a length at least equal to the width of the belt 73 and, as represented in FIG. 9, has the form of an inverted trough 21 extending transversely across the belt. The trough 21 has its front end closed by a vertical front end piece 22 (FIG. 8) and its rear end closed by a similar end piece (not shown). The end pieces support the trough 21 so that its front and rear edges 21a and 21b are separated from the upper surface of the bottom plate 16 by a distance sufficient to permit the passage of the belt 73. A semi-partition 23 is mounted on the bottom plate 16 beneath the trough 21 and extends from the front end piece 22 to the corresponding rear end piece (not shown). The upper edge of the semi-pertition 23 rises to a height exceeding that of the front and rear edges 21a and 21b of the trough 21, but sufficiently less than the height of the inner surface of the trough 21 so as to form a gap sufficient to permit free passage of the return flight 73c of the lower belt 73 over the semi-partition 23. The edges 21a and 21b of the trough 21 and the top edge of the semi-partition 23 may, of course, be rounded to minimize wear on the belt 73. A source of compressed air (not shown) may be supplied to the air chamber 20 via a tube 24 (FIG. 10) coupled to the front end piece 22.

When compressed air is supplied to the air chamber 20 through the tube 24, the air accumulates in the trough 21 forcing the liquid level down to a depth equal approximately to the height of the edges 21a and 21b. Inasmuch as the top edge 23a of the semi-partition 23 is somewhat higher than the edges 21a and 21b, the detergent-bleach solution will be prevented from flowing from the compartment 4 to the compartment 3. At the same time, the belt 73 rises from the liquid on the rear side of the semi-partition 23, passes over its top edge, and descends into the alkaline solution on the forward side of the semi-partition 23. Hence, only the inconsequential amount of detergent-bleach solution wetting the surfaces of the belt 73, as it passes through the air over the semi-partition 23, will be intermixed with the alkaline solution of the compartment 3. The chamber 20 therefore provides an effective lock through which the lower belt 73 may continuously pass from the compartment 4 into the compartment 3 as it returns toward the feeder section 170 of the system.

Figure 14:
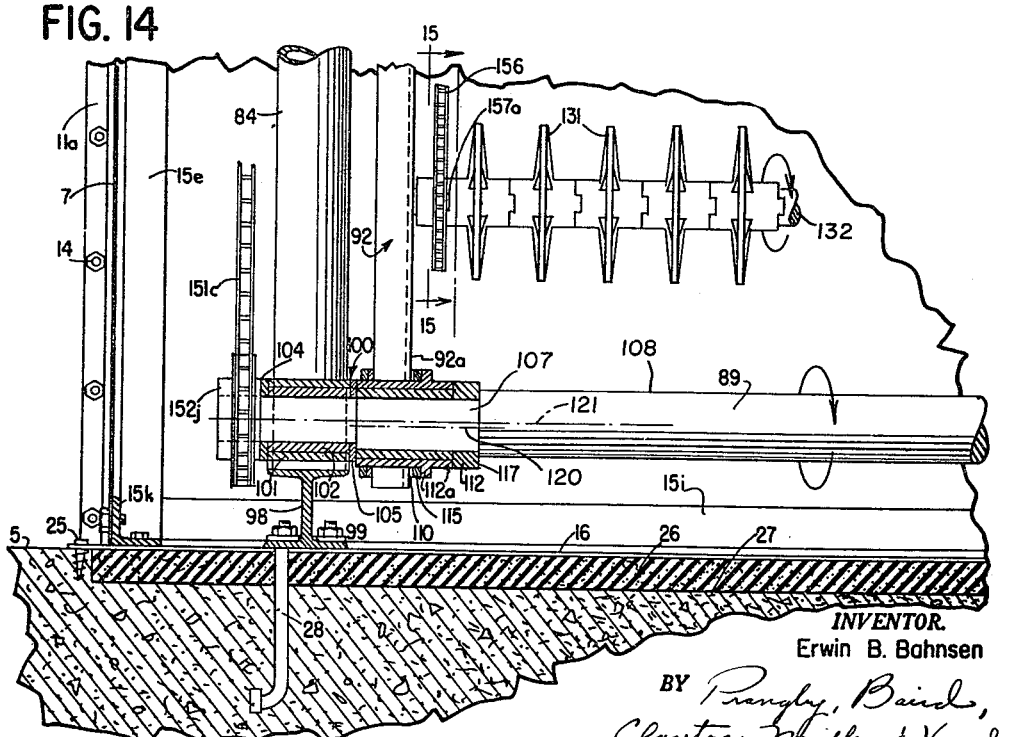
FIG. 14 is a similar fragmentary transverse cross section taken substantially along the vertical plane 14—14 of FIG. 8, and representing structural details of the tank foundation, the orbital and roller drive mechanisms and mountings, and their supporting members.

The tank 2 may rest upon the floor 5 made of reinforced concrete or other suitable material, and the edges of the bottom plate 16 (FIG. 14) may be secured to the floor 5 by a plurality of screws 25. To damp vibrations and reduce noise, if desired, a layer of insulation 26 may be disposed beneath the bottom plate 16 in a shallow rectangular cavity 27 provided in the floor 5. The second compartment 4 of the tank 2 may also have a drain pipe 28 (FIG. 14) for emptying the detergent-bleach solution whenever it becomes too contaminated for further use or when the compartment 4 becomes too full.

The conveyor transport mechanism 70 (FIG. 6) generally comprises the orbital support frame 80 (FIGS. 6 and 8), the orbital drive mechanism 146 (FIGS. 6 and 8), the rollers 130 (FIGS. 1, 9, 11 and 13), and the roller drive mechanism 155 (FIG. 19). As set forth above, the function of the conveyor transport mechanism 70 is to support and drive the conveyor 71 through the washer stage 1. The conveyor 71 is carried on the rollers 130, while the roller-drive mechanism 155 rotates selected ones of the rollers 130 to impart lineal motion to the conveyor. The orbital support frame 80 provides support for the structure carrying the rotatable rollers 130, and the orbital drive mechanism 146, on the other hand, moves the rollers 130 in an orbital motion, preferably of about one-eighth inch radius at a repetition frequency of around 400 cycles per minute. Hence, the elemental portions of the conveyor 71 and of any work 19 it may be carrying, travel along a cycloidal path as they move through the cleansing solutions of the tank 2, and the resultant appulsive-reactive interaction between the work 19 and the cleansing solutions produces unexpectedly rapid and thorough disassociation of dirt.

The orbital support frame 80 stands within the tank 2 and is comprised principally of a rectangular upper support 81 resting on vertical columns 82, 83, 84 and 85 (FIG. 6); upper rotatable drive shafts 86 and 87 (FIGS. 6, 8 and 9) mounted on the rectangular support 81 above the compartments 3 and 4, respectively; lower rotatable drive shafts 88 and 89 mounted below and in the same vertical planes as the drive shafts 86 and 87, respectively; and the roller-support brackets or walls 90 and 91 mounted vertically in the compartment 3 on the drive shafts 86 and 88, and the roller support brackets or walls 92 and 93 mounted vertically in the compartment 4 on the shafts 87 and 89. In a manner to be described more fully below, the orbital drive mechanism 146 rotates the drive shafts 86, 87, 88 and 89 simultaneously in order to impart orbital motion to the roller-support brackets 90, 91, 92 and 93, thereby imparting the orbital motion to the rollers 130 mounted thereon and to the conveyor 71 and the work 19 carried thereby.

Figure 5:
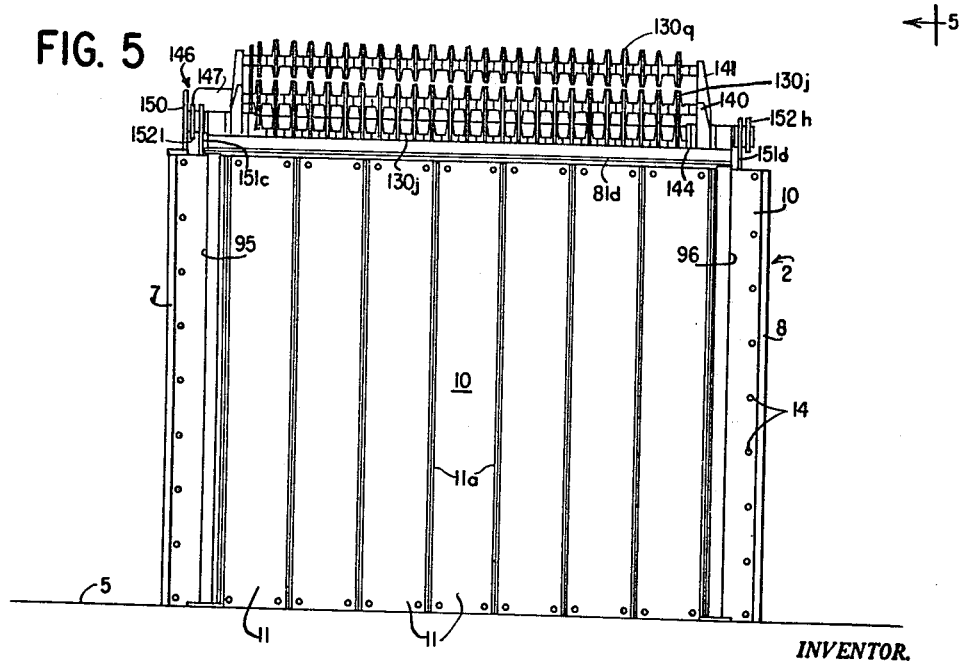
FIG. 5 is a rear elevation of the washer stage, as seen from the direction of the arrows 5—5 in FIG. 4, representing general features of the tank and exit rollers, but with certain parts, such as the conveying belts removed, for clearness of illustration.

The rectangular upper support 81 is comprised of front and rear I-beams 81a and 81b (FIG. 6) joined at their ends by rectangular cross bars 81c and 81d (FIG. 4 and 5). To insure against longitudinal vibrations of the rectangular support 81, it may be braced by beams 94, 95, 96 and a fourth beam (not shown) extending downwardly and outwardly to the floor 5 from respective points on the support 81 adjacent to the four corners of the tank 2.

The vertical columns 82 and 83 carry the front end of the rectangular support 81, and their lower ends are respectively mounted in the compartment 3 on a front I-beam pedestal 97 (FIGS. 8 and 10) and a similar rear pedestal (not shown). The vertical columns 84 and 85 carry the rear end of the rectangular support 81 and are mounted in the compartment 4 on a front I-beam pedestal 98 and a similar rear pedestal (not shown), respectively. The I-beam pedestals are secured by bolts 99 (FIG. 14) to the bottom plate 16 of the tank 2.

The lower drive shaft 88 extends transversely across the compartment 3 from the front I-beam pedestal 97 to the opposite rear I-beam pedestal (not shown). Likewise, the lower drive shaft 89 extends transversely across the compartment 4 from the front I-beam pedestal 98 to the opposite rear I-beam pedestal (not shown). The upper drive shafts 86 and 87 are mounted on the rectangular support 81 in vertical planes common to the lower drive shafts 88 and 89, respectively.

Figure 12:
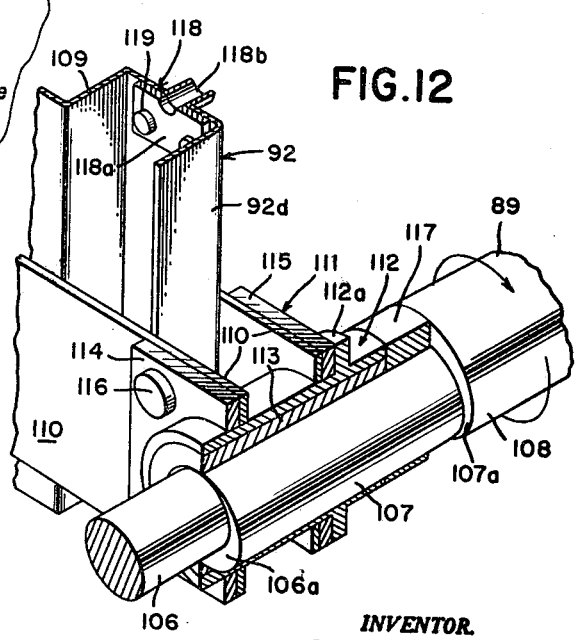
FIG. 12 is an enlarged fragmentary perspective view, in partial section, representing the eccentrically-rotatable mounting structure of the orbital frame.
Figure 13:
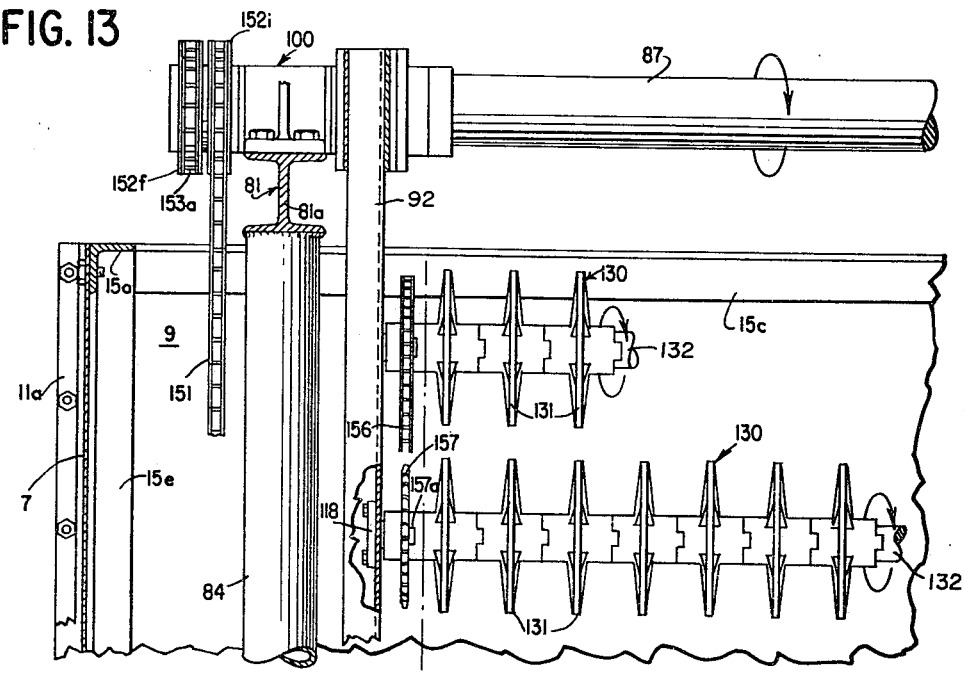
FIG. 13 is an enlarged fragmentary transverse cross section taken substantially along the vertical plane 13—13 of FIG. 8 representing structural details of the orbital and roller drive mechanism and mountings, and their supporting members.

Each of the drive shafts 86, 87, 88 and 89 is formed from a round bar of stainless steel or other material having the requisite properties of corrosion resistance and strength. The ends of the shafts 86 to 89 are reduced in diameter to provide a bearing surface 106 (FIG. 12). Adjacent to the bearing surface 106 on each end of the shafts 86 to 89 there is an eccentric surface 107 having a maximum diameter somewhat greater than that of the bearing surface 106 but less than the diameter of the mid-portion 108 of the shafts 86 to 89. The bearing surfaces 106 of the shafts 86 to 89 are journaled in sleeve bearing assemblies 100 (FIG. 14), and the eccentric surfaces 107 of the respective shafts carry the roller-support brackets 90, 91, 92 and 93. As represented in FIG. 23, the eccentric axes 120 of the surfaces 107 are preferably displaced one-eighth inch along a common radius from the principal axes 121 of the shafts 86 to 89.

Inasmuch as the bearing assemblies 100 are used on each end of each of the drive shafts 86-89, only the one represented for the front end of the shaft 89 (FIGS. 10, 12 and 14) will be described. This assembly comprises a housing 101 and a bearing sleeve 102 press-fitted tightly in a hole through the housing. The bearing housing 101 is cast or machined to have mounting flanges 101a and 101b which fit flatly against the upper surafce of the pedestal 98 and are provided with holes to accommodate bolts or screws 103. The front end of the shaft 89 is reduced in diameter to provide the bearing surface 106 and to provide a shoulder 106a which helps to prevent the shaft 89 from sliding in the direction of its axis. The bearing surface 106 of the shaft 89 extends beyond the housing 100 a short distance to enable a sprocket 152j of the orbital drive mechanism 146 to be secured in place thereon. A ring 104 provides bearing surfaces between the housing 101 and the sprocket 152j, and a ring 105 provides bearing surfaces between the housing 101 and the shoulder 106a.

The roller-support brackets 90, 91, 92 and 93, fabricated from sheet magnesium or other light, corrosion-proof material, are made rigid in the vertical direction by corrugations 109, and in the horizontal direction by reinforcement plates 110 secured to each side of the brackets 90–93 along their upper and lower edges. To facilitate mechanical assembly of the orbital support frame 80, and to provide for circulation of the cleansing solutions in the tank compartments 3 and 4, each of the brackets 90 to 93 is fabricated in two similar spaced-apart sections. Thus, the bracket 90 (FIGS. 6 and 8) is comprised of sections 90a and 90b coupled in spaced-apart relation by the reinforcement plates 110. Likewise, the bracket 91 (FIG. 6) is comprised of sections 91a and 91b, the bracket 92 is comprised of sections 92a and 92b, and the bracket 93 is comprised of sections 93a and 93b. The brackets 90 and 91, carried in the compartment 3 on the drive shafts 86 and 88, provide support for the two tiers 130a and 130b of the rollers 130. The brackets 92 and 93, carried in the compartment 4 on the drive shafts 87 and 89, provide support for the four tiers 130d, 130e, 130f and 130g of the rollers 130.

To mount the roller-support brackets 90, 91, 92 and 93 on the eccentric surfaces 107 of the respective drive shafts 86 to 89, each bracket 90 to 93 is provided with an upper and a lower bearing assembly 111 (FIG. 12) secured to reinforcement plates 110 in a position between the spaced-apart sections 90a and 90b, 91a and 91b, 92a and 92b, and 93a and 93b of the brackets 90 to 93, respectively. Because the eight bearing assemblies required for the brackets 90 to 93 are alike, only the assembly 111 employed at the front end of the shaft 89 (FIG. 12) will be described. This assembly is made up of a cylindrical housing 112 having an annular flange 112a spaced a short distance from one end, and a sleeve bearing 113 lining the inner wall of the cylindrical opening through the housing 112. The reinforcement plates 110 spanning the space separating the section 92a from its adjacent section 92b are strengthened by rectangular blocks 114 and 115 secured to the outer surfaces of the reinforcement plates 110 with rivets or bolts 116. Holes are provided in the blocks 114 and 115, and in the plates 110, to accommodate the housing 112 which is positioned therein so that the annular flange 112a fits against the block 115. A spacer ring 117 provides bearing surfaces between the shoulder 107a of the shaft and the adjacent end surface of the housing 112 and the sleeve bearing 113. Hence, rotation of the drive shafts 86 to 89 will turn the eccentric surfaces 107 within the bearing assemblies 111, and cause a resultant displacement of the roller-support brackets 90 to 93 along the aforedescribed orbital path.

To provide suitable means for mounting the rollers 130 of the tiers 130a, 130b, 130d, 130e, 130f and 130g, holes in staggered relation for each tier are made in adjacent inward corrugations of the brackets 90 to 93, and pivot blocks 118 (FIGS. 10, 11 and 12) are secured in position to the outer surfaces of the roller-support brackets 90 to 93 at each hole by screws or bolts 119. Each pivot block 118 comprises a pedestal 118a and an integral cylindrical bearing stud 118b projecting far enough to extend a short distance beyond the holes in the brackets 90 to 93.

Figure 11:
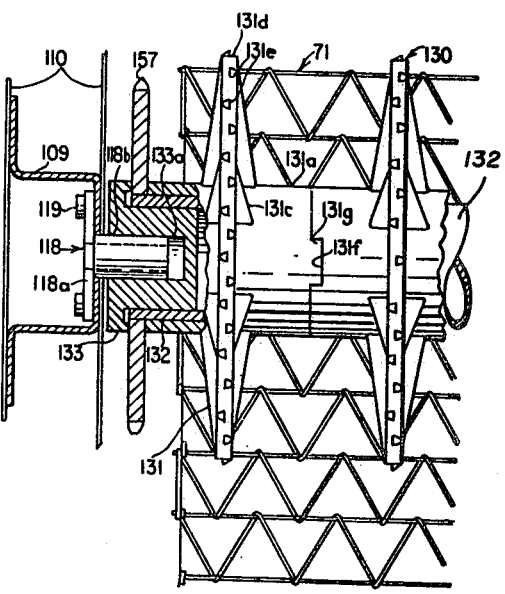
FIG. 11 is an enlarged fragmentary cross section representing structural details of the conveyor belt, the conveyor-transport rollers, and their rotatable mounting in the orbital frame.
Figure 15:
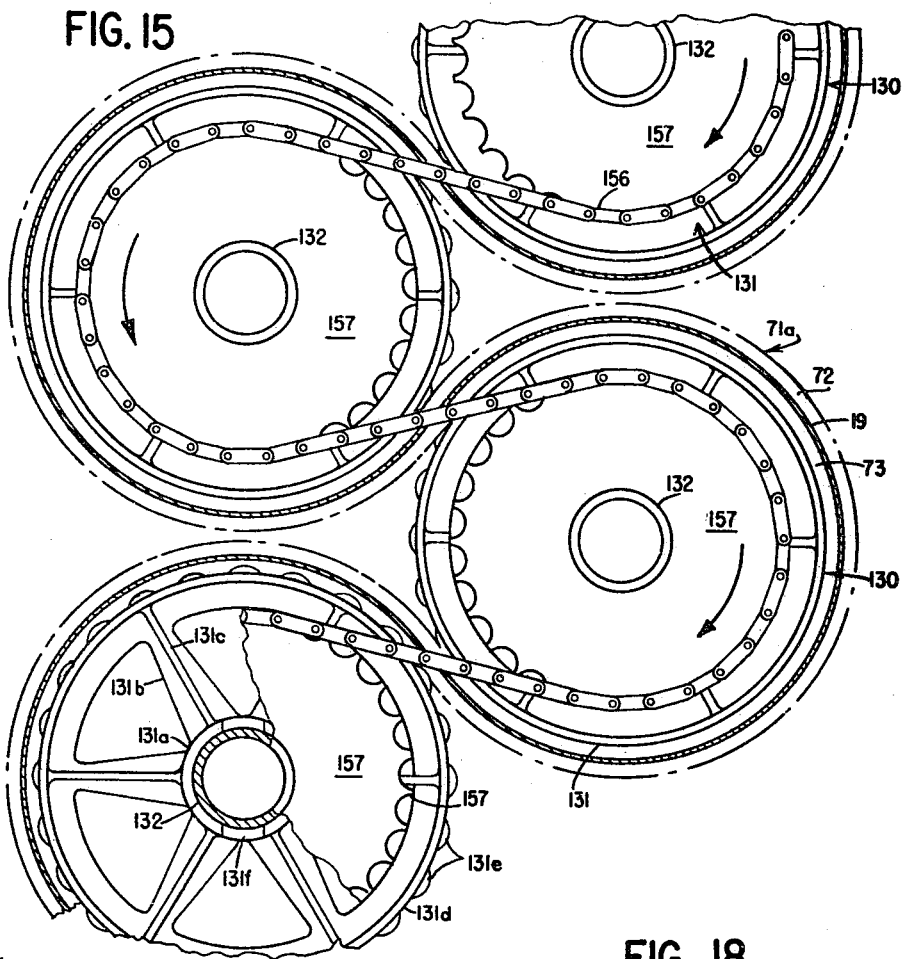
FIG. 15 is a greatly enlarged partial longitudinal cross section taken substantially along the vertical plane 15—15 of FIG. 14, and representing structural details of the rollers and roller drive mechanism.

As represented best in FIGS. 11 and 15, the rollers 130 are individually comprised of a plurality of wheels 131 in conjoint relation on hollow cylindrical shafts 132. The length of the shafts 132 is great enough to span most of the distance between opposite roller-support brackets 90 and 91, and 92 and 93, respectively. The wheels 131 are molded of plastic, for example, of nylon or "Teflon," and have cylindrical hubs 131a and radial spokes 131b reinforced with ribs 131c. The outer peripheral surface 131d of the wheels have a series of small, uniformly-spaced protuberances 131e to engage the web of the conveyor 71. To interlock the wheels 131, their hubs 131a are provided with notches 131f (FIG. 11) on one end and mating projections 131g on the other end. Hence, when a plurality of the wheels 131 are installed by slipping the same axially onto the shafts 132, the notches 131f and the projections 131g dovetail. This effectively eliminates relative rotation between the adjoining wheels 131. A drive sprocket 157 having a projection 157a (FIGS. 13 and 14) mating with a corresponding notch 131f of the adjacent endmost wheel 131 is applied to one end of each shaft 132, and a ring, corresponding in axial thickness to that of the drive sprocket 157 (see FIG. 11), is applied to the opposite end of each shaft 132, each such ring having a notch therein for receiving, in dovetail fashion, the projection 131g of the next adjacent wheel 131, Each drive sprocket 157 and its corresponding ring are secured to the opposite ends of their respective shaft 132 such as by welding or by appropriate set screws or the like. Thus, it will be understood that the assembly of wheels 131 on each shaft 132 is secured against axial movement along the shaft by the drive sprocket 157 and the corresponding ring at the opposite ends of each shaft 132. At the same time, although the wheels 131 are not fixed directly to their associated shaft 132, they are prevented from rotation relative to the shaft 132 by reason of the dovetailing of their own recesses 131f and projections 131g and the dovetailing of the recesses and projections of the endmost wheels 131 with the coresponding projections 157a and recesses of the drive sprocket 157 and corresponding ring at the opposite ends of the shaft 132. The open ends of the shafts 132 are plugged with round bearing blocks 133. Each bearing block 133 has a cylindrical recess 133a for engaging the bearing stud 118b of one of the pivot blocks 118. From the foregoing, it should be apparent that the rollers 130 are uniquely designed for light weight, high strength, and minimum wear on the conveyor belts 72 and 73.

As shown best in FIGS. 4, 5 and 9, the rollers 130h, 130i, 130j, 130m, 130q, 130u, and 130w are mounted on vertical brackets secured to the orbital support frame 80. Hence, the driven rollers 130h and 130w are mounted on short vertical brackets 139 secured to the upper reinforcement plates 110 of the roller-support brackets 90 to 93, and the drive roller 130c is mounted between those upper reinforcement plates 110, the idler rollers 130j and 130m are mounted on short brackets 144 also secured to the upper reinforcement plates 110 of the roller-support brackets 90 to 93, and the rollers 130i, 130q and 130u are mounted, respectively, on vertical brackets 140, 141 and 143, secured, in turn, to the rectangular support 31 of the orbital support frame 80. The idler rollers 130k and 130l for the return flight of the conveyor belt 73 are mounted on brackets 145 (FIG. 9), which are secured to the bottom plate 16 of the tank 2. The drive roller 130r for the return flight of the belt 72, the roller 130n for the return flight of the belt 73, and the rollers 130p, 130s, 130t, 130v and 135 may be mounted on a framework (not shown) constructed in accordance with conventional and well-known design principles.

The orbital drive mechanism 146 (FIGS. 4, 6 and 8) is comprised of an electric motor 147 for driving the roller-support brackets 90 to 93 via an endless drive chain 148, engaging a sprocket 149 of the motor 147 and a sprocket 150 on the shaft 86, an endless transmission chain 151a extending between an inner sprocket 152a on the front end of the shaft 86 and a sprocket 152c on the front end of the shaft 88, a chain 151b extending between a sprocket 152b and a sprocket (not shown) secured to the rear ends, respectively, of the shafts 86 and 88, a chain 153a extending between another sprocket 152e on the front of the shaft 86 and a sprocket 152f on the front of the shaft 87, a chain 153b extending between sprockets 152g and 152h on the rear ends respectively of the shafts 86 and 87, a chain 151c extending between an inner sprocket 152i on the front end of the shaft 87 and a sprocket 152j on the front end of the shaft 89, and a chain 151d extending between a sprocket 152k and a sprocket (not shown) on the rear ends, respectively, of the shafts 87 and 89. Thus, the torque developed by the electric motor 147 is coupled to the front and rear ends of each of the four drive shafts 86 to 89 via positive chain and sprocket transmissions. Hence, with the maximum radii of the eccentric surfaces 107 (FIG. 12) of the shafts 86 to 89 properly aligned in the same direction when the orbital support frame 80 and the drive mechanism 146 are assembled, the shafts will rotate synchronously thereafter, and the roller-support brackets 90 to 93 will move along the aforedescribed orbit. If it is desired that the drive chains 151a, 151b, 151c and 151d be maintained out of contact with the solutions in the tank 2, they may be enclosed in suitable tubular casings (not shown) which extend downwardly from above the solution level to the approximate bottom of the tank where they also enclose in a liquid-tight manner the drive sprockets on the opposite ends of the shafts 88 and 89.

The motor 147 of the orbital drive mechanism 146 is secured to the top surface of the I-beam 81a of the rectangular support 81. To increase the effective power transmitted to the shaft 86 from the motor 147, the rate of rotation may be reduced by making the driven sprocket 150 on the shaft 86 somewhat larger in diameter than the driving sprocket 149 of the motor 147.

The roller drive mechanism 155 (FIG. 19) is comprised of an endless chain 156 which engages the sprocket 157 on each of the drive rollers of the numerical series 130; namely, each roller of the tiers 130a, 130b, 130d, 130e, 130f and 130g, and the rollers 130c, 130h, 130r, 130t, 130v and 130w. In addition, the chain 156 also engages a sprocket 193 of the drum 191 of the detergent wringer stage 190. The chain 156 is driven from a sprocket 158 by an electric motor 159. As represented in FIG. 15, the roller drive chain 156 and the sprocket 158 are of conventional construction. Moreover, the chain 156 engages the sprocket 157 of each roller of tiers 130a, 130b, 130d, 130e, 130f and 130g, thereby driving all of these rollers simultaneously at the same speed. Because the chain 156 engages the sprockets 157 of successive rollers of each tier on alternate sides, as represented in FIG. 15, each succeeding roller rotates in a direction opposite to that of the preceding roller. This is indicated in FIG. 15 by the arrows. Hence, the upper roller, for example, is rotated in a clockwise direction, and the roller in staggered position immediately beneath it is rotated in a counterclockwise direction. The laminar portion 71a of the conveyor carrying the flatwork 19 also engages the wheels 131 of successive rollers 130 on alternate sides. This arrangement tends to equalize the wear on the belts 72 and 73 as they traverse the rollers 130. The fact that each roller of the tiers 130a, 130b, 130d, 130e, 130f and 130g is driven, minimizes the stress on the belts 72 and 73, thereby prolonging their useful life. Furthermore, the size and proximate spacing of the rollers 130 insures that the orbital motion of the rollers 130 is translated continuously into cycloidal movement of elemental portions of the flatwork 19 throughout the time it is immersed in the cleansing fluids, even during the time that the conveyor 71 is traversing the gaps between the rollers 130. This is an important structural feature of the invention which helps minimize the necessary length of the path of travel through the cleansing agent. The fact that each of the rollers of the tiers 130a, 130b, 130d, 130e, 130f and 130g is driven, lengthens the useful life of the belts 72 and 73 by minimizing the stresses to which they are subjected while passing through the tank 2.

In the foregoing paragraphs, the significant structural details of the washer stage 1 have been described with especial emphasis on the features of novelty which render the method and apparatus superior to the continuous washer technology known to the prior art. As explained above, the extraordinarily thorough and rapid disassociation of dirt from the work being processed is attributable principally to the appulsive-reactive interaction between it and the cleansing solutions. This interaction, in turn, is achieved by applying an orbital motion to the rollers of the tiers 130a, 130b, 130d, 130e, 130f and 130g immersed in the fluids of the tank 2. The resulting combination of orbital motion with the normal lineal movement of the conveyor 71 causes the elemental portions of the conveyor and the flatwork 19 to follow cycloidal paths through the cleansing solutions. The cycloidal motion produces the desired appulsive-reactive interaction between the cleaning fluid and the work, and continues almost without interruption from the moment the work enters the breaking solution in the compartment 3 until it emerges from the detergent-bleach solution in the compartment 4. The repetition frequency of the cycloid is the same as that of the orbital motion imparted to the laminar portion 71a of the conveyor, preferably about 400 cycles per minute with a radial displacement of about one-eighth inch, although it is, of course, within the scope of the invention to utilize faster or slower cyclic speeds and greater or lesser radial displacements.

It will be understood that the elemental portions of the work 19 are subjected to several species of cycloidal motion. More specifically, while traveling in a generally horizontal straight path, the elemental portions of the work 19 are subjected to simple cycloidal motion, and while traveling in an inclined straight path, the elemental portions of the work 19 may be subjected to prolate cycloidal motion or curtate cycloidal motion. On the other hand, while traveling in an arcuate or part-circular path, the elemental portions of the work 19 may be subjected to epicycloidal motion or hypocycloidal motion. All forms of cycloidal motion mentioned above produce an improved washing speed and action and an improved cleansing efficiency due to the snapping or whipping action imparted to the elemental portions of the work 19, see FIG. 21. This snapping or whipping action results from the sudden acceleration and deceleration and reversals in acceleration to which the elemental portions of the work 19 are subjected during cycloidal motion thereof, there being a high acceleration and a sharp reversal of acceleration at the end of each cycle.

Upon emergence from the washer stage 1, the flatwork 19 is fed automatically to the detergent-wringer stage 190 via the discharge section 171 of the conveyor 71.

DETERGENT AND RINSE WRINGERS

The detergent-wringer stage 190 and the rinse wringer 260 are similar in function and essential structure. Their function is to express as much fluid as possible from the work 19. In the case of the detergent-wringer stage 190, latent detergent-bleach present in the work 19 emerging from the compartment 4 of the tank 2 is expressed, and in the case of the rinse-wringer stage 260, latent rinse effluent present in the work 19 emerging from the rinser stage 220 is expressed.

As represented in FIG. 16, the detergent-wringer stage 190 comprises the previously mentioned carrier drum 191 mounted for counterclockwise rotation on a shaft 191a, and a pressure roller 192 resiliently mounted in contact with the drum 191 for clockwise rotation around a shaft 192a. Hence, work emerging from the washer stage becomes sandwiched between the lower belt 73 and the guide belt 136. Thereafter, it is conducted clockwise through an arc of about 180 degrees around the feeder roller 130i and deposited on the surface of the carrier drum 191. The rotation of the carrier drum 191 transports the work to the point where it is engaged by a pressure roller 192 which exerts sufficient pressure to squeeze out a large percentage of the detergent-bleach solution. The detergent-bleach solution expressed from the work by the detergent wringer stage 190 flows away via any suitable drain (not shown).

As represented in FIG. 19, both the carrier drum 191 and the pressure roller 192 are driven by the electric motor 159 of the roller drive mechanism 155 operating via the drive sprocket 158 and the endless chain 156. The chain 156 engages a sprocket 193 of the carrier drum 191 to drive the latter directly. The pressure roller 192, on the other hand, is driven by a drive chain 258 of the rinser stage 220, the chain 258 being shown by a broken line in FIG. 19 so as to distinguish it from the chain 156. The rinser drive chain 258 is itself driven by another sprocket (not shown) that is secured to the shaft 191a of the drum 191, and the chain 258 engages a sprocket 195 on the pressure roller 192.

After passing between the drum 191 and the pressure roller 192, the work is deposited on a lower belt 223 of the rinser conveyor 221 for transportation through the rinser stage 220.

The rinse wringer stage 260 is similar in function and essential structure to the detergent wringer stage 190. The rinse wringer stage 260 expresses a large percentage of the rinse solution from the work 19 emerging from the rinser stage 220.

Like the detergent wringer stage 190, the rinse wringer stage 260 is of the pressure-roller type. It is made up of a carrier drum 261 mounted for rotation around a shaft 261a, and two pressure rollers 262 and 263 resiliently mounted in rolling contact with the surface of the drum 261 on shafts 262a and 263a, respectively. Hence, work 19 emerging from the rinser stage 220 is deposited automatically on the surface of the drum 261 for transportation between the drum 261 and the pressure rollers 262 and 263. The pressure applied by the rollers 262 and 263 squeezes a large percentage of the rinse solution from the work 19. The solution expressed in this manner flows away through a suitable drain (not shown).

As shown in FIG. 19, the rinse wringer stage 260 also is driven by the rinser drive chain 258 which, as previously stated, is driven by the driven drum 191. The rinser drive chain 258 drivingly engages a sprocket 264 secured to the shaft 261a of the carrier drum 261 and sprockets 265 and 266 secured respectively to pressure-roller shafts 262a and 263a, respectively, of the pressure rollers 262 and 263. An idler sprocket 267 mounted for rotation around a shaft 267a makes it possible to route the chain 258 between the sprockets 265 and 266 in order to drive both of the latter in a counterclockwise direction, the direction required for movement of the contiguous surfaces of the carrier drum 261 and the pressure rollers 262 and 263 in a common direction.

After passing through the rinse wringer stage 260, the work is deposited automatically on the conveyor 276 of the dryer stage 275.

THE RINSER

In the rinser stage 220, the detergent-bleach solution remaining in the work 19 upon its emergence from the detergent wringer stage 190 effectively is washed away by a mist of water and superheated steam or other gas or air continuously forced through the work 19 from a plurality of elongated nozzles transversely disposed above and in effective contact with the work 19 as it is carried beneath them on a conveyor. In accordance with this invention, economy of operation and superior rinsing effectiveness are achieved notwithstanding the fact that the rinse water and steam or air or other gas flow continuously. As explained below in greater detail, this improved economy and rinsing action are attributable both to the use of a steam-water or air-water or gas-water mist forcefully expelled from a plurality of nozzles effectively in contact with the work 19 passing beneath their openings, and to successive reuse of the rinse effluent by conducting it in a countercurrent direction from the last through each nozzle to the first of the series.

As represented best in FIG. 16, the rinser stage 220 is comprised generally of the rinser conveyor 221, four "knife" rinsing units 230a, 230b, 230c and 230d for forming and discharging the water-steam or water-air or water-gas mist through the work 19 carried by the rinser conveyor 221, four vessels 240a, 240b, 240c and 240d for collecting the rinse effluent from each of the four units, and four force pumps 250a, 250b, 250c and 250d for forcing the effluent in a countercurrent direction from one vessel to the next in each successive rinsing unit and from the vessel 240d to the compartment 3 of the tank 2 (FIG. 1) via the pipe 251. Water from a water source (not shown) is supplied to the rinsing unit 230a via the pipe 252 and superheated steam or air or other inert gas provided through the pipes 253, is added to the rinse solution in each of the rinsing units 230a, 230b, 230c and 230d. A valve 254 makes it possible to regulate the flow of the water, and a valve 255 makes it possible to regulate the flow of steam, air or other gas to the rinsing units 230a, 230b, 230c and 230d to an appropriate rate. The countercurrent flow path of the rinse solution through the rinser stage 220 is from the pipe 252 to the rinsing unit 230a, through the conveyor 221 and the flatwork 19 carried thereby to the vessel 240a to the rinsing unit 230b via a pipe 256a and the force pump 250a, again through the conveyor 221 and the work 19 to the vessel 240b, thence to the rinsing unit 230c via a pipe 256b and the force pump 250b, once again through conveyor 221 and the work 19 to the vessel 240c, finally to the rinsing unit 230d via a pipe 256c and the force pump 250c, again through the conveyors 221 and the work 19 to the vessel 240d, and finally to the compartment 3 of the tank 2 via the pipe 251 and the force pump 250d. It is, of course, to be understood that the pumps may be of conventional structure and may be driven in any suitable way.

The rinser conveyor 221 is made up of upper and lower, open mesh, endless belts 222 and 223 and is inclined upwardly and to the right as viewed in FIGS. 1 and 16 at an angle of about 10°. The upper belt 222, disposed for rotation in the counterclockwise direction on driven rollers 224a and 224b, has a lower flight in contiguous relation with the upper flight of the lower belt 223, thereby forming a laminar portion 221a of the rinser conveyor 221 for sandwiching the flatwork 19 (FIG. 17) interjacently during its trip through the rinser stage 220. The lower belt 223, disposed for rotation in the clockwise direction on a driven roller 224c and idler rollers 224d and 224e, has an upper flight supported along its midsection by the upper surfaces of the closely-spaced vessels 240a, 240b, 240c and 240d.

It is desirable to maximize the penetration of the flatwork 19 (FIG. 17) by the steam-water or air-water or gas-water mist, while minimizing the leakage of effluent between the rinsing units and the work 19. To achieve this objective, the upper belt 222 is preferably made of stainless steel wire of comparatively light gauge woven to form a fourdrinier mesh, and its lower flight is disposed in sliding contact with the broad under surfaces of the rinsing units 230a, 230b, 230c, and 230d. Because the principal function of the lower belt 223 is to support the flatwork 19 (FIG. 17), while presenting minimum opposition to the passage of effluent from the work into the vessels 240a, 240b, 240c and 240d, it is made of larger stainless steel wire 223a (FIG. 17) woven to have a relatively coarse mesh, much coarser than that of the upper belt 222.

At the receiving end of the conveyor 221, the lower belt 223 extends somewhat beyond the upper belt 222, and a portion of its upper flight is supported on the idler roller 224e in contiguous relation with the surface of the detergent-wringer drum 191 in order to receive work entering the rinser stage 220. At the discharge end of the conveyor 221, the upper belt 222 diverges from the lower belt 223 and loops around the driven roller 224b for its return flight to the roller 224a and the receiving end of the conveyor. From the point of divergence, the work 19 travels a short distance on the lower belt 223 before entering the rinse wringer stage 260.

To feed the work from the rinser stage 220 into the rinse wringer stage 260, an endless guide belt 227 is disposed on rollers 228 and 229, and in contiguity with the lower arc of the loop forced around the driven roller 224c by the belt 223. Hence, the work 19 carried from the point of divergence on the upper surface of the lower belt 223 becomes sandwiched between the guide belt 227 and the lower belt 223, and is carried in this position until it is deposited automatically on the surface of the rinse-wringer carrier drum 261. The rollers 224a, 244b, 224c, 224d, 224e, 228 and 229 are mounted rotatably on shafts 226.

As represented in FIG. 19, the conveyor 221 is driven from the electric motor 159 via the roller drive chain 156 coupled to the shaft 191a of the carrier drum 191 via the sprocket 193, and thence via the other sprocket (not shown) that is also coupled to the shaft 191a for transmitting power to the endless rinser and rinse-wringer drive chain 258. The endless drive chain 258 travels in a clockwise direction from its drive sprocket on the shaft 191a and engages in clockwise order the sprocket 157 of the feeder roller 130i, a sprocket 225b of the driven roller 224b supporting the discharge end of the upper belt 222, a sprocket 225c of the driven roller 224c supporting the discharge end of the lower belt 223, the sprocket 265 of the pressure roller 262, the idler sprocket 267, the sprocket 266 of the pressure roller 263, the sprocket 264 of the carrier drum 261, a sprocket 225a of the roller 224a supporting the receiving end of the upper belt 222, a sprocket 282 of a roller 281a for supporting a guide belt 280 at the discharge end of the dryer conveyor 276, the sprocket 195 of the pressure roller 192, and thence to the drive sprocket secured to the shaft 191a of the carrier drum 191.

Figure 18:
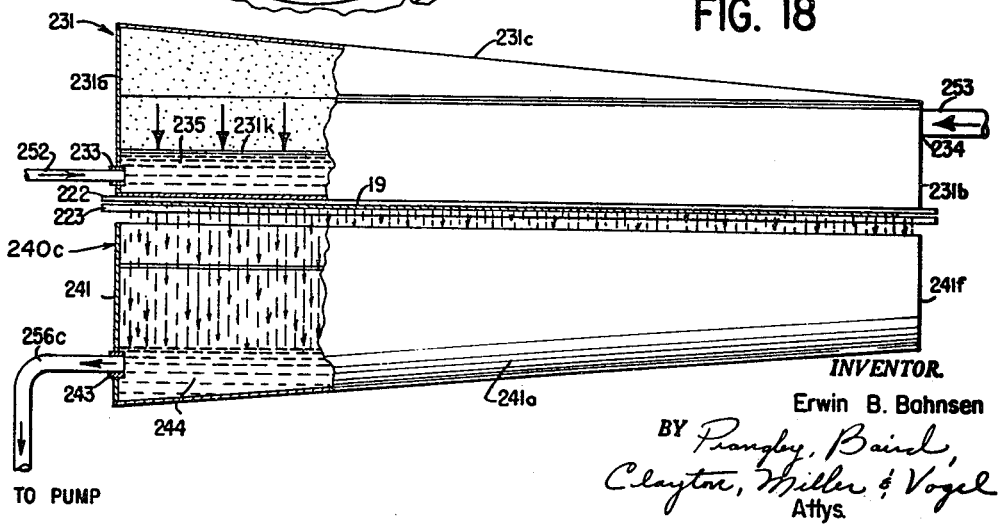
FIG. 18 is an elevation in partial cross section of one of the knife rinsing units utilized in the rinsing stage.

Inasmuch as the knife rinsing units 230a, 230b, 230c and 230d are alike in all essential respects, only the one represented in FIGS. 17 and 18 will be described. Each unit is comprised of an elongated pressure chamber 231 having its longitudinal axis disposed in transverse relation to the direction of movement of the conveyor 221. The pressure chamber 231 has a vertical front side wall 231a and a rear side wall 231b, a convex top 231c sloping from the front side wall 231a to the rear side wall 231b, and symmetrical end walls 231d and 231e tapering inwardly from top to bottom and bent inwardly to form gently rounded corners and integral flat sections 231f and 231g on the bottom of the chamber 231. A sharper bend is made near the edges of the bottom sections 231f and 231g to form spaced-apart parallel vertical flanges 231h and 231i extending into the interior of the pressure chamber 231, and still another sharp bend in the same direction is made adjacent the edges of the vertical flanges 231h and 231i to form narrow horizontal flanges 231j and 231k. The elongated opening formed between the bottom sections 231f and 231g constitutes a nozzle 232 extending from the side wall 231a to the side wall 231b. The water supply pipe 252 or one of the pipes 256a, 256b or 256c is coupled to the front side wall 231a at an opening 233, located near its bottom edge, and the steam or air or gas supply pipe 253 is coupled to the rear side wall 231b at an opening 234 located near its top edge. Hence, water 235 entering the pressure chamber 231 accumulates in the bottom on one side of the nozzle 232, and the remainder of the chamber is filled with superheated steam or air or gas under pressure. When the level of the water 235 exceeds the height of the horizontal flanges 231j and 231k, it mixes with the steam, air or gas, and the resulting mist is compelled forcefully from the pressure chamber 231 through the nozzle 232, the upper belt 222, the flatwork 19, the lower belt 223, and thence into the vessel 240c, carrying with it much of the detergent-bleach solution which was in the flatwork 19.

The vessels 240a, 240b, 240c and 240d are alike in all essential respects. For this reason only the vessel 240c represented in FIGS. 17 and 18 will be described. This vessel 240c is an elongated container having a generally V-shaped cross section. The vessel 240c has a V-shaped bottom wall 241a, and a generally flat top wall 241b. The bottom wall 241a merges into the top wall 241b at gently rounded corners 241c and 241d. An elongated opening 242 extends along the median line of the top wall 241b, and the wall portions adjacent to the longitudinal edges of the opening 242 are sloped downwardly so that rinse effluent descending from the nozzle 232 of the pressure chamber 231 will drain into the interior of the vessel 240c. The ends of the vessel 240c are closed by a front end wall 241e and rear end wall 241f. As shown in FIG. 18, the receiving end of the pipe 256c, is coupled to the front end wall 241e at an opening 243, and the V-shaped bottom 241a is sloped downwardly from the rear end wall 241f toward the opening 243 to provide good drainage for the rinse effluent 244.

Each of the force pumps 250a, 250b, 250c and 250d withdraws the rinse effluent collected in the immediately preceding vessel and forces it through the pipes 256a, 256b, 256c or 215 in a direction opposite to the direction of movement of the laminar conveyor portion 221a and into the next rinsing unit 230b, 230c, 230d, or into the compartment 3 of the tank 2, as may be the case. It is this reuse of the same rinse effluent, together with the use of steam, air or gas in each of the rinsing units 230a, 230b, 230c and 230d which largely accounts for the low rate of water consumption, making it economically feasible to rinse work continuously at the same high speed of operation as that achieved in the washer stage 1.

It should be understood, of course, that hot air or other gases may be used in lieu of steam, as repeated above, to form and to force the mist through the flatwork 19 from any one or more of the rinsing units 230a, 230b, 230c and 230d. Moreover, it will be apparent that a framework or other structure in accordance with conventional design principles may be utilized to support the shafts 226 of the rollers 224a, 224b, 224c, 224d and 224e, the rinsing units 230a, 230b, 230c, 230d, the vessels 240a, 240b, 240c, the force pumps 250a, 250b, 250c and 250d, and all other components of the rinser stage 220. Likewise, conventional means may be utilized for mounting the carrier drums 191 and 261, and the pressure rollers 192, and 262, and 263, and the other components of the detergent and rinse wringer stages 190 and 260.

After the latent detergent-bleach solution has been removed in the rinser stage 220, the work 19 automatically passes through the rinse wringer stage 260 where a large percentage of the rinse solution is expressed in the manner described above, and then the work 19 passes to the dryer stage 275.

THE DRYER

The dryer stage 275 evaporates most of the rinse solution remaining in the work 19 after it has passed through the rinse wringer stage 260, and leaves it with a moisture content appropriate for ironing. Alternatively, the dryer stage 275 may be adjusted to dry the work to the extent necessary to make it ready for immediate use.

As represented best in FIGS. 1 and 16, the dryer stage 275 comprises the endless belt conveyor 276 having a horizontal upper flight 276a disposed above a series of heat producing elements. The conveyor belt 276, made of wire mesh, has a receiving end looped around an idler roller 278a disposed beneath the carrier drum 261 of the rinse wringer stage 260, and a discharge end looped around an idler roller 278c (FIG. 1) disposed at the end of a vertical flight 276b. The upper horizontal flight 276a of the conveyor bends downwardly around a drive roller 278b where it merges into the vertical flight 276b. The return flight 276c of the conveyor loops around an idler roller 278d.

To hold the work securely in place while being carried down the vertical flight 276b, and to provide a horizontal discharge flight for the work 19, the endless guide belt 280 is supported on the drive roller 281a, an idler roller 281b, an idler roller 283, and the idler roller 278c so that one of its flights is in laminar relation with the vertical flight 276b of the dryer conveyor. Hence, the work 19 is enveloped between the contiguous surfaces of the belts 276 and 280 while it is transported down the vertical flight 276b. Guide rollers 279a and 279b are disposed on opposite sides of the vertical flight 276b so that the belts 276 and 280 are pressed together tightly against the work 19. This minimizes the possibility that the work 19 will slide out of position as it is carried down the vertical flight 276b. At the idler roller 278c, the belt 276 diverges from the belt 280, and the latter continues for a short horizontal discharge flight 280a to the idler roller 281c. The return flight 280b is carried around the idler roller 281b, and thence to the drive roller 281a where it reconverges against the belt 276.

As shown in FIG. 19, the dryer conveyor belt 276 is driven in a counterclockwise direction by an endless chain 284 engaging a sprocket 279 of the drive roller 278b. The chain 284 is driven, in turn, from another sprocket (not shown) mounted on the shaft 191a of the detergent wringer carrier drum 191. The belt 280 is driven in a clockwise direction by the rinser drive chain 258 engaging the sprocket 282 of the roller 281a.

In the embodiment shown in FIG. 1, gas is supplied from a source (not shown) to a plurality of gas burners 277. The burners 277 are elongated so that they extend transversely across the entire width of the dryer conveyor 276, and it will be understood that, while only six burners are shown in FIG. 1, the illustration in that regard is merely schematic, since many more burners would normally be employed. The upper horizontal flight 276a is disposed so that it carries the work through flames 277a emanating from the burners. The moisture content of the work and the comparatively high speed of the conveyor 276 prevents the work from being burned or scorched. Another preferred, and novel, combination of drying means, however, is shown in FIG. 16. There, a plurality of gas-fired infrared burners 277b, of known commercial construction and schematically illustrated in FIG. 16, are spaced apart beneath and transverse with respect to the dryer conveyor 276, with gas being fed to the burners through ordinary gas pipes, not shown. Between each of the infrared units 277b, there are disposed a plurality of hot-air manifolds 285 which extend transversely beneath the entire width of the conveyor 276. Each manifold 285 is provided along its top with an elongated, restricted, air discharge nozzle 285a which likewise extends transversely beneath the entire width of the conveyor 276. Heated air, at about 150° F., is fed under pressure to the manifolds 285 by conventional pipes (not shown), and the heated air is thus discharged upwardly through the conveyor 276 and through the flatwork 19 carried thereby. This heater and air discharge arrangement shown in FIG. 16 is, of course, shown schematically, and it will be understood that more heaters 277b and air manifolds 285 may be employed than are illustrated therein. The combination heater and air discharge arrangement, however, represents an important discovery in the art of continuous drying, for it has been found that the rate at which drying can be accomplished with this arrangement is substantially greater than with the use of merely conventional flame drying and the like. Why this is so is not yet fully known, but it is believed that the heaters 277b cause the moisture in the flatwork to flash to steam, whereupon the succeeding air blasts of hot air immediately drive the steam out of the fabric before the steam begins to condense.

OPERATION

The washing system represented in the drawings can function to wash, rinse, and dry flatwork continuously, rapidly, automatically, thoroughly, economically and with minimum wear and tear on the work. The operation of the system will be described principally with reference to FIGS. 1, 8, 16 and 19.

The system is prepared for operation by filling the compartment 3 of the tank 2 with an appropriate alkaline solution to disintegrate and loosen soil, and by filling the compartment 4 of the tank 2 with an appropriate detergent-bleach solution to effect disassociation of the soil from the body of the work. These solutions are added until they cover the rollers of the tiers 130a, 130b, 130d, 130e, 130f and 130g. When the compartments 3 and 4 are filled to the proper level, the motor 147 is energized in order to drive the support brackets 90 to 93 (FIG. 8) on which the rollers of the tiers 130a, 130b, 130d, 130e, 130f and 130g are mounted, and the motor 159 (FIG. 19) is energized to start the conveyor 71 of the washer stage 1, the conveyor 221 of the rinser stage 220, the conveyor 276 of the dryer stage 275, and the drums 191 and 261 of the detergent and rinse wringer stages 190 and 260, respectively. As described above, the motor 159 drives the conveyor 71 and the drum 191 of the detergent wringer stage 190 via the endless chain 156 coupled to the sprockets 157 on various ones of the rollers 130, including each of the rollers comprising the tiers 130a, 130b, 130d, 130e, 130f and 130g, and sprocket 193 of drum 191. The conveyor 221, the drum 261, and the belt 280 of the dryer stage 275 are driven from the motor 159 via the endless chain 156 and the endless chain 258, the power for the latter being supplied from the former via a sprocket (not shown) mounted on the shaft 191a (FIG. 16). The belt 276 of the dryer stage 275 is driven from the motor 159 via the chains 156 and 284, the power for the latter likewise being supplied from the former via another sprocket (not shown) mounted on the shaft 191a (FIG. 16).

Water and steam or air or other gas are supplied to the rinsing units 230a, 230b, 230c and 230d by opening the valves 254 and 255, respectively, the force pumps 250a, 250b, 250c and 250d are energized, and the burners 277 or 277b of the dryer stage 275 are ignited. As explained hereinabove, when the novel drying system of FIG. 16 is used, the burners 277b are ignited and hot air is also supplied under pressure to the manifolds 285. When these things have been accomplished, the entire washing system represented in FIG. 1 and/or FIG. 16 is in readiness for immediate use. The flatwork 19 (FIG. 17) to be processed is taken to the feeder section 170 of the washer stage 1 (FIG. 1) arranged on or fed onto the horizontal flight 73b of the lower belt 73. The lower belt 73 then carries the flatwork 19 to the roller 130s where it becomes interleaved between the belts 72 and 73 forming the laminar portion 71a of the conveyor 71. From this point, the flatwork 19 travels along a vertical path via the guide roller 134, the driven roller 130t, and the guide roller 130u. After traveling over the rim of the tank 2 via the rollers 130v and 130w, the laminar portion 71a of the conveyor 71 becomes subject to the orbital movement of the support brackets 90 to 93. Hence, the concurrent linear travel of the conveyor 71 and the orbital motion of the rollers 130 with respect to the orbital support frame 80 combine to produce a cycloidal path for elemental portions of the conveyor 71 and the elemental portions of the flatwork 19. Thus, the flatwork 19 is moving cycloidally as it enters the alkaline solution in the compartment 3 and begins traversing the sinuous path between and around the rollers of the tier 130a, and the rollers of the subsequent tiers. During the travel of the flatwork through this cycloidal sinuous path, the cycloidal motion, which is preferably of rather rapid frequency, as hereinabove stated, causes mutual appulsion and reaction between the flatwork and the cleaning solutions, and the sections of the flatwork at the open meshes of the belts is caused to flex, drum or "oil can" back and forth, as illustrated in FIG. 21 by the solid and broken lines therein. This produces the very high cleaning efficiency referred to above.

After descending to the lower end of the tier 130a, the conveyor 71 ascends along a sinuous path up and around the staggered rollers of the tier 130b. From the tier 130b, the conveyor 71 rises out of the alkaline solution in the compartment 3 and carries the flatwork 19 on a short aerial flight 71b over the upper edge of the partition 6 via the roller 130c, and then into the detergent-bleach solution contained in the compartment 4. In this compartment, the sinuous path of the conveyor 71 is down the tier 130d, up the tier 130e, down the tier 130f, and up the tier 130g. From the tier 130g the conveyor 71 rises out of the detergent-bleach solution and loops around the roller 130h. Upon leaving the roller 130h, the upper belt 72 of the conveyor 71 diverges from the lower belt 73, while the latter bearing the flatwork 19 continues along the short horizontal discharge flight 73a to the roller 130i. At this point, the flatwork 19 becomes interleaved between the belt 73 and the guide belt 136 for a short trip around the roller 130i to the surface of the carrier drum 191 of the detergent wringer stage 190. Inasmuch as the roller 130h was the last of the rollers 130 mounted on the moving support brackets 90 to 93 mounted on the orbital support frame 80, cycloidal movement ends on the horizontal flight 73a.

It should be noticed that the cycloidal motion of the conveyor 71 and the flatwork 19 continues without interruption from the time of first entry into the alkaline solution of the compartment 3 until emergence from the detergent-bleach solution of the compartment 4 at the roller 130h. Furthermore, the frequency and displacement amplitude for the cycloidal movement are chosen to produce optimum appulsive-reactive interaction between the cleansing solutions and the work; that is, an interaction which will result in the most efficient disassociation of dirt.

After deposit on the rotating surface of the detergent-wringer drum 191, the flatwork 19 rides for about a quarter of a revolution, and then passes beneath the pressure roller 192 which expresses a large percentage of the detergent-bleach solution from the flatwork 19. From the pressure roller 192, the flatwork 19 continues to ride the surface of the carrier drum 191 for a short distance until it becomes interleaved between the surface of the drum 191 and the upper surface of the lower belt 223 of the rinser conveyor 221. The flatwork 19 travels along an upward incline of the lower belt 223 to the driven roller 224a where it becomes interleaved between the lower belt 223 and the upper belt 222 forming the laminar portion 221a of the rinser conveyor 221. While traveling up the incline on the rinse conveyor 221, the flatwork 19 passes successively beneath the rinsing units 230d, 230c, 230b and 230a, in the order named. At the unit 230d, for example, the flatwork 19 is penetrated forcefully by a knife-like hot water-steam or water-air or water-gas mist emitted under pressure from the nozzle 232 (FIG. 17) and comprised of steam or air or gas and rinse effluent already used three times previously in the rinsing units 230c, 230b and 230a. Subsequently, the flatwork 19 is penetrated forcefully three more times at the rinsing unit 230c, 230b and 230a by progressively cleaner mists emitted under pressure from the nozzles 232 of these units.

As described above, each of the rinsing units 230a, 230b, 230c, and 230d uses the same rinse water supplied originally to the unit 230a from the pipe 252. Hence, at the final stage of rinsing beneath the unit 230a, the flatwork 19 is penetrated by a water-steam or water-air or water-gas mist which is completely uncontaminated. The rinse effluent from the unit 230a descends into and is collected in the vessel 240a. Then it is pumped by force pump 250a to the rinsing unit 230b where it is combined with steam, air or gas once again and is forced as a mist through the conveyor 221 and the work 19, if any, passing beneath its nozzle 232 at the time. In like manner, rinse effluent is collected and reused at the units 230c and 230d. The rinse effluent collected in the vessel 240d at the first stage of rinsing is pumped by the pump 250d through the pipe 251 to the compartment 3 of the washer stage 1 where it replenishes liquid absorbed in the flatwork 19 leaving the tank 2. Whenever the volume of liquid supplied to compartment 3 in this manner becomes greater than that removed by the flatwork 19, excess liquid overflows and is carried away by an overflow drain (not shown) or, if desired, by the drain 28 illustrated in FIG. 14.

Notwithstanding the fact that rinse water flows continuously during the time that the rinser stage 220 is in operation, rinsing effectiveness is enhanced and the rate of water usage reduced to an economically feasible level by mixing it with steam or air or other gas to form a mist, forcing the mist through the work under the pressure of the steam, air or gas, and reusing the same rinse effluent successively in a counterflow arrangement.

At the driven roller 224b, the upper belt 222 diverges from the lower belt 223, and the latter continues with the flatwork 19 to the roller 224c, where it becomes enveloped between the guide belt 227 and the lower belt 223 which conduct it downwardly to the surface of the carrier drum 261 of the rinse wringer stage 260. The flatwork 19 then rides on the drum 261 until it passes beneath the pressure rollers 262 and 263 which squeeze out a large percentage of the rinse water in the work.

From the pressure roller 263, the flatwork 19 drops to the horizontal belt 276 of the dryer stage 275 which carries it through a succession of flames 277a from the gas burners 277, if the dryer mechanism of FIG. 1 is employed. Alternately, if the dryer embodiment of FIG. 16 is used, the flatwork is carried successively over the infrared heaters 277b and the intervening knife-like hot air blasts or jets produced by the manifolds 285 and their nozzles 285a, whereby the moisture in the flatwork is subjected repeatedly, it is believed, to a flashing of its moisture to steam and an immediate blowing away of the steam by the hot air blasts. After traveling through the last flame or over the last heater of the series, the flatwork 19 becomes interleaved between the conveyor belt 276 and the conveyor belt 280 for a short downward flight 276b to the horizontal discharge flight 280a, from which the work, now clean and dry, may be taken for use, or further processing as required.

It will be apparent from the foregoing description of the method and apparatus of this invention that a washing system incorporating its features will wash, rinse, and dry heavily-soiled work very rapidly and efficiently. Indeed, as hereinbefore stated, it has been found that the method and apparatus of the present invention will wash, rinse and dry soiled flatwork in less than four per cent of the time required by conventional batch-type equipment. Moreover, the extraordinary speed and thoroughness with which these results may be accomplished are attributable principally to a novel and highly effective appulsive-reactive interaction between the work and the cleansing solutions, and to the use of knife-type rinsing units in a counterflow arrangement permitting the same rinsing solution to flow continuously and be reused several times. The drying rate also is enhanced by passing the damp work directly through a multiplicity of flames, as in FIG. 1, or over the successive infrared heaters and hot air blasts illustrated in FIG. 16.

It is expected that a washing system of the type described above, designed to have a conveyor belt ten feet in width and traveling at the rate of about eighty feet per minute, will be able to wash eighteen hundred pounds of dry, heavily-soiled work in about three minutes.

It will readily be understood by those skilled in the art that numerous variations may be made in the illustrated embodiments of the present method and apparatus. For example, it will be appreciated that, although the tiers of rollers 130 are disposed vertically in the above described machine, they need not be so disposed, for their orientation with respect to the vertical is of no special consequence insofar as the novel washing action is concerned. The tiers might be individually oscillated; they might be contained in separate tanks, if desired; they might be disposed horizontally; and they might even be disposed horizontally and individually in a series of overhead tanks, if that be desired. All of these variations, and many more, are within the intended scope of the present invention.

What is claimed is:

1. A method of continuously and rapidly rinsing and drying fabric articles having cleansing solution therein comprising the steps of: transporting the articles along a first predetermined path while forcing a mist of a gas and a rinse liquid through the articles, thereby to rinse the cleansing solution from the articles; and transporting the articles along a second predetermined path while subjecting the articles to a source of heat, thereby to evaporate at least a portion of the rinse liquid from the articles to dry the articles.

2. The method set forth in claim 1, wherein said first predetermined path is upwardly inclined in the direction of travel of the articles.

3. The method set forth in claim 1, wherein the gas is heated.

4. The method set forth in claim 1, wherein the gas is steam.

5. The method set forth in claim 1, wherein the rinse liquid is water.

6. The method set forth in claim 1, and further comprising the step of mechanically wringing excess cleansing solution from the articles prior to transporting thereof along said first predetermined path.

7. The method set forth in claim 1, and further comprising the step of mechanically wringing excess rinse liquid from the articles after transport thereof along said first predetermined path and prior to transporting thereof along said second predetermined path.

8. The method set forth in claim 1, wherein the source of heat is a combustible gas flame.

9. The method set forth in claim 1, wherein said source of heat is a source of radiant heat.

10. The method set forth in claim 1, wherein said source of heat includes both a source of radiant heat and a blast of hot air directed onto and through the articles.

11. The method set forth in claim 10, wherein the hot air has a temperature of about 150° F.

12. A method of continuously and rapidly rinsing and drying fabric articles having cleansing solution therein comprising the steps of: transporting the articles along a first predetermined path while forcing a mist of a gas and a rinse liquid through the articles at spaced-apart points along said first predetermined path, thereby to rise the cleansing solution from the articles; and transporting the articles along a second predetermined path while subjecting the articles to a source of heat, thereby to evaporate at least a portion of the rinse liquid from the articles to dry the articles.

13. The method set forth in claim 12, wherein the same body of rinse liquid is utilized throughout and flows countercurrent with respect to the movement of the articles along said first predetermined path.

14. A method of continuously and rapidly rinsing and drying fabric articles having a cleansing solution therein comprising the steps of: transporting the articles along a first predetermined path while forcing a mist of a gas and a rinse fluid through the articles, thereby to rinse the cleansing solution from the articles; and transporting the articles along a second predetermined path while subjecting the articles to a plurality of spaced-apart sources of radiant heat and a corresponding plurality of successive blasts of hot air, thereby to evaporate at least a portion of the rinse fluid from the articles to dry the articles.

15. The method set forth in claim 14, wherein said source of radiant heat is a gas-fired infrared burner.

16. The method set forth in claim 14, wherein the hot air has a temperature of about 150° F.

17. A high-speed continuous apparatus for rinsing and drying fabric articles having cleansing solution therein comprising: a rinsing unit including a pressure chamber for generating a mist of a gas and a rinse fluid and including a nozzle through which the mist is forcefully expelled from said pressure chamber, a rinse conveyor for transporting the articles along a first predetermined path past said nozzle to force the midst through the articles, a collecting vessel disposed adjacent to said rinse conveyor for receiving the mist and the cleansing solution carried thereby passing through the articles, thereby to rinse the cleansing solution from the articles; a source of heat, and a drying conveyor for transporting the articles along a second predetermined path adjacent to said source of heat, thereby to evaporate at least a portion of the rinse fluid from the articles to dry the articles.

18. The apparatus set forth in claim 17, wherein said first predetermined path is upwardly inclined in the direction of travel of said rinse conveyor.

19. The apparatus set forth in claim 17, wherein said rinse conveyor includes two foraminous conveyor flights arranged in laminar relationship and holding the articles therebetween.

20. The apparatus set forth in claim 19, wherein said foraminous conveyor flight disposed toward said nozzles is formed of a plurality of interlaced wires of relatively light gauge arranged in a fourdrinier mesh, and said foraminous conveyor flight disposed away from said nozzles is formed of a plurality of interlaced wires of relatively heavy gauge arranged in a coarse mesh.

21. The apparatus set forth in claim 17, and further comprising a wringer of the pressure-roller type disposed at the input to said rinse conveyor for wringing excess cleansing solution from the articles.

22. The apparatus set forth in claim 17, and further comprising a wringer of the pressure-roller type disposed between said rinse conveyor and said drying conveyor for wringing excess rinse fluid from the articles.

23. The apparatus set forth in claim 17, wherein said source of heat is a combustible gas burner of the open-flame type.

24. The apparatus set forth in claim 17, wherein said source of heat is a gas-fired infrared burner.

25. A high-speed continuous apparatus for rinsing and drying fabric articles having cleansing solution therein comprising: a plurality of spaced-apart rinsing units arranged in general alignment and each including a pressure chamber and a discharge nozzle therefor, the pressure chamber of each rinsing unit serving to generate a mist of a gas and a rinse fluid and forcefully to expel the mist through the associated nozzle, a rinse conveyor for transporting the articles along a first predetermined path said rinsing units and in position such that the mist from said nozzles is forced through the articles at spaced-apart points along said rinse conveyor, a plurality of collecting vessels corresponding in number to said rinsing units and disposed adjacent to said rinse conveyor for receiving the mist and the cleansing solution carried thereby passing through the articles from the nozzle of the associated rinsing unit, thereby to rinse the cleaning solution from the articles; a source of heat, and a drying conveyor for transporting the articles along a second predetermined path adjacent to said source of heat, thereby to evaporate at least a portion of the rinse fluid from the articles to dry the articles.

26. The apparatus set forth in claim 25, and further comprising a plurality of pumps corresponding in number to said pressure chambers and connected to pump the effluent from one collecting vessel as the input to the adjacent one of said pressure chambers, whereby to reuse the rinse fluid in said rinsing units.

27. The apparatus set forth in claim 26, wherein said pumps serve to move the rinse fluid in a countercurrent direction with respect to the movement of said rinse conveyor.

28. The apparatus set forth in claim 25, and further comprising a source of gas under pressure connected to each of said pressure chambers, a source of rinse fluid connected to the one of said pressure chambers disposed adjacent to the outlet of said rinse conveyor, a plurality of pumps constructed and connected so that the effluent of said collecting vessel corresponding to said one pressure chamber is pumped into the next adjacent pressure chamber as the rinse fluid output thereto and the effluent from all the remainder of said collecting vessels but the collecting vessel disposed adjacent to the input of said rinse conveyor being pumped as the rinse fluid input into the next adjacent pressure chamber and the effluent from said collecting vessel disposed adjacent to the input of said rinse conveyor being pumped as an input to said tank.

29. The apparatus set forth in claim 25, wherein said rinse conveyor is upwardly inclined in the direction of travel of the articles thereon.

30. A high-speed continuous apparatus for rinsing and drying fabric articles having cleansing solution therein comprising: a rinsing unit including a pressure chamber for generating a mist of a gas and a rinse fluid and including a nozzle through which the mist is forcefully expelled from said pressure chamber, a rinse conveyor for transporting the articles along a first predetermined path past said nozzle to force the mist through the articles, a collecting vessel disposed adjacent to said rinse conveyor for receiving the mist and the cleansing solution thereby passing through the articles, thereby to rinse the cleansing solution from the articles; a plurality of spaced-apart sources of radiant heat arranged in general alignment, a drying conveyor for transporting the articles along a second predetermined path adjacent to said sources of radiant heat, and a plurality of air discharge nozzles corresponding in number to said sources of radiant heat and disposed adjacent to said drying conveyor and immediately adjacent to the associated source of radiant heat on the side thereof in the direction of travel of the articles, said air discharge nozzles each directing a stream of heated air onto the articles transported along said second predetermined path by said drying conveyor to carry away rinse fluid vapor formed by exposure of the articles to the associated source of radiant heat, thereby to evaporate at least a portion of the rinse fluid from the article to dry the articles.

31. The apparatus set forth in claim 30, wherein said source of radiant heat and said air discharge nozzles are both located on the same side of said drying conveyor.

32. The apparatus set forth in claim 30, wherein said source of radiant heat and said air discharge nozzles are both disposed below said drying conveyor.

33. The apparatus set forth in claim 30, wherein a plurality of air discharge nozzles is provided between each adjacent pair of the sources of radiant heat.

34. A method of continuously and rapidly rinsing cleansing solution from fabric articles comprising the steps of: transporting the articles along a predetermined path, repeatedly forcing a mixture of a gas and a rinse liquid under pressure through the articles at spaced-apart points along said predetermined path, thereby to rinse the cleansing solution from the articles, and utilizing the same body of rinse liquid throughout wherein the rinse liquid flows counter-current with respect to the movement of the articles along said predetermined path.

References Cited

UNITED STATES PATENTS

| | | | |
|---|---|---|---|
| 1,387,072 | 8/1921 | Putnam | 68—20 X |
| 1,764,631 | 6/1930 | Hubinger | 68—44 |

WILLIAM I. PRICE, Primary Examiner

U.S. Cl. X.R.

68—5